US012423662B2

(12) United States Patent
Luedeman et al.

(10) Patent No.: US 12,423,662 B2
(45) Date of Patent: Sep. 23, 2025

(54) FACILITATING INTELLIGENT ASSET MANAGEMENT UTILIZING GRAPHICAL USER INTERFACES COMPRISING DYNAMIC ASSET MANAGEMENT USER INTERFACE ELEMENTS

(71) Applicant: Chime Financial, Inc., San Francisco, CA (US)

(72) Inventors: Robert Luedeman, San Francisco, CA (US); Paola Heneine, San Francisco, CA (US); Qiulu Gong, San Francisco, CA (US); Baishi Wu, Cambridge, MA (US)

(73) Assignee: Chime Financial, Inc., San Francisco, CA (US)

( * ) Notice: Subject to any disclaimer, the term of this patent is extended or adjusted under 35 U.S.C. 154(b) by 36 days.

(21) Appl. No.: 18/333,954

(22) Filed: Jun. 13, 2023

(65) Prior Publication Data
US 2024/0420104 A1 Dec. 19, 2024

(51) Int. Cl.
*G06Q 20/10* (2012.01)
(52) U.S. Cl.
CPC ................................ *G06Q 20/108* (2013.01)
(58) Field of Classification Search
CPC .................................................... G06Q 20/108
See application file for complete search history.

(56) References Cited

U.S. PATENT DOCUMENTS

| 10,169,812 | B1* | 1/2019 | Bajgier | G06Q 20/108 |
| 11,928,655 | B1* | 3/2024 | Bowers | G06Q 40/06 |
| 2015/0379644 | A1* | 12/2015 | Danielak | G06Q 20/108 |
| | | | | 705/36 R |
| 2017/0323345 | A1* | 11/2017 | Flowers | G06Q 30/0269 |
| 2018/0060843 | A1* | 3/2018 | Maheshwari | G06Q 50/01 |
| 2019/0205983 | A1* | 7/2019 | Gurunathan | G06Q 20/02 |

\* cited by examiner

*Primary Examiner* — Raven E Yono
(74) *Attorney, Agent, or Firm* — Keller Preece PLLC

(57) ABSTRACT

The present disclosure relates to systems, non-transitory computer-readable media, and methods that, as part of an internetwork facilitation system, facilitate intelligent asset management through user interface elements that present selectable intelligent asset repayment models for user accounts. In particular, the systems can provide for display within a graphical user interface of a computing device corresponding to a user account, a selectable intelligent asset repayment element. Further, the systems can select an intelligent asset repayment model from a plurality of asset repayment models. Additionally, the systems can utilize the intelligent asset repayment model to transfer assets from the user account by: determining that the user account fails to satisfy an asset threshold corresponding to a deadline time, monitoring the user account for a post-deadline asset transfer; and in response to identifying the post-deadline asset transfer, initiating a digital transfer of assets from the user account according to an asset allocation hierarchy.

20 Claims, 11 Drawing Sheets

FACILITATING INTELLIGENT ASSET MANAGEMENT UTILIZING GRAPHICAL USER INTERFACES COMPRISING DYNAMIC ASSET MANAGEMENT USER INTERFACE ELEMENTS

BACKGROUND

In recent years, both popularity and usage of online digital content and asset management systems have increased. Indeed, the proliferation of web and mobile applications has enabled client devices (e.g., mobile phones, tablets, laptop/desktop computers) to utilize online systems to view and manage digital assets over computer networks using an application on the client device. Many conventional systems provide various graphical user interfaces (GUIs) to present user account management options to client devices within applications of mobile devices (or other computing devices). Although conventional systems attempt to present asset and account management options on web-based and mobile-based applications, such conventional systems face a number of technical shortcomings, particularly with regard to presenting such options efficiently and doing so with minimal user interaction which can result in excess use of computing resources. Further, conventional systems lack functional flexibility in aligning accounts with scheduling and intelligent management of dynamic assets.

For instance, many conventional systems are rigid in their approach to managing digital accounts and corresponding assets relative to repayment obligations. Conventional systems, provide limited, simplistic analysis of account information, such as determining whether the account has a positive balance or has been overdrawn. Additionally, many conventional systems provide a single limited option for individual asset transfers out of an account for repayment management. To illustrate, many conventional systems rigidly execute and manage asset transfers according to a fixed schedule, such as a monthly transfer.

Furthermore, many conventional systems utilize rigid approaches that require multiple user interfaces to coherently present options corresponding to asset management within limited screen spaces of GUIs (e.g., in mobile devices). In particular, many conventional systems require a large number of user interactions and multiple user interfaces to manage digital assets, asset transfers, and account management options. To illustrate, to modify a scheduled asset transfer, conventional systems often require a variety of user interfaces and interactions via a client device to implement the modification.

BRIEF SUMMARY

Embodiments of the present disclosure provide benefits and/or solve one or more of the foregoing or other problems in the art with systems, non-transitory computer-readable media, and methods for intelligently managing assets according to user input received through generated graphical user interfaces comprising dynamic user interface elements. In particular, the disclosed systems can provide for selectable options within a user interface for selecting an intelligent asset repayment model from among a variety of possible asset repayment models. Moreover, the disclosed systems can utilize the intelligent asset repayment model to dynamically transfer assets as post-deadline asset transfers migrate to a user account. For example, upon receiving user input to select an intelligent asset repayment model and detecting that a user account fails to satisfy an asset threshold corresponding to a deadline time, the disclosed systems can monitor the user account for a post-deadline asset transfer. Indeed, the disclosed systems can determine that the post-deadline asset transfer provides sufficient user account assets to make payments. Further, the systems can initiate a series of transfers for allocating the user's assets according to a predetermined asset allocation hierarchy.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
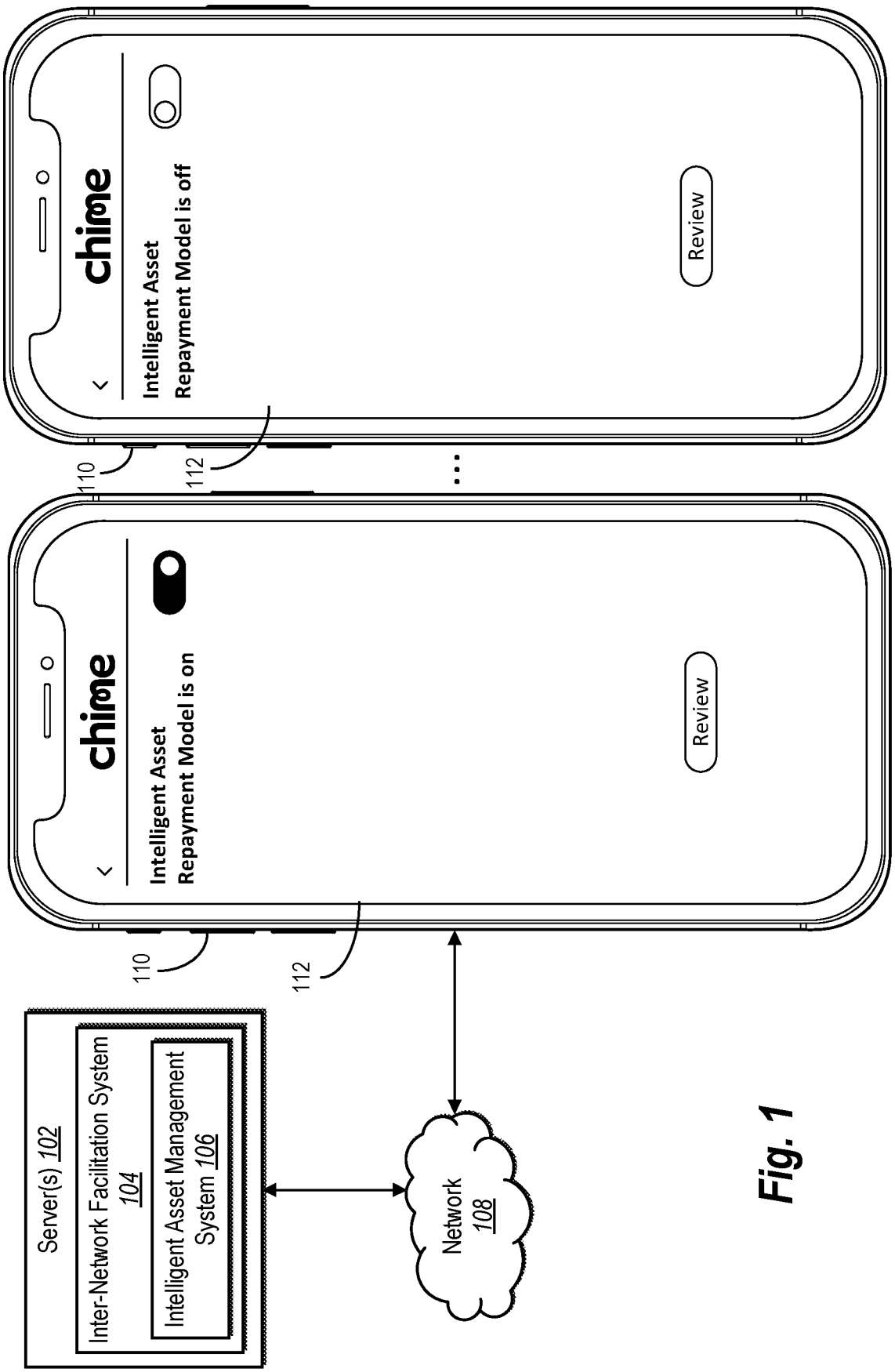
FIG. 1 illustrates a schematic diagram of a system environment in which an intelligent asset management system can operate in accordance with one or more embodiments.

This disclosure describes one or more embodiments of an intelligent asset management system that generates graphical user interfaces comprising dynamic user interface elements for intelligently adjusting assets of a user account according to an intelligent asset repayment model and asset allocation hierarchy. For example, the intelligent asset management system can provide selectable options for various asset repayment models, including an intelligent asset repayment model that dynamically monitors user accounts to identify and manage post-deadline asset transfers to satisfy user account obligations. To elaborate, the intelligent asset management system monitors a user account to determine that the user account fails to satisfy an asset threshold corresponding to a deadline time (e.g., that the user account payment is delinquent or likely to become delinquent). In response to client selection of an intelligent asset repayment model, the intelligent asset management system can generate notifications on the user interface of a client device, including a notification regarding the account status and intelligent management of the account. For instance, the intelligent asset management system can detect a post-deadline deposit to the user account and verify the sufficiency of user account assets. Upon determining a sufficient post-deadline asset transfer, the intelligent asset management system can utilize an asset allocation hierarchy to automatically initiate one or more transfers. Thus, the intelligent asset management system can flexibly monitor digital accounts over time, analyze post-deadline asset transfers, and intelligently distribute assets according to an asset allocation hierarchy that accurately manages the account assets according to a variety of pre-existing obligations.

As just mentioned, in one or more embodiments, the intelligent asset management system generates dynamic asset management user interface elements to implement user-designated asset management preferences. For example, the intelligent asset management system can generate a selectable intelligent asset repayment element for display within a graphical user interface of a client device. Indeed, the intelligent asset management system can provide a variety of account management options through the user interface of a client device. Additionally, the intelligent asset management system can receive input via the user interface and implement a selected asset repayment model. Further, the intelligent asset management system can implement a number of asset repayment models, such as an automatic asset repayment model corresponding to a deadline time, the intelligent asset repayment model, and a client-initiated asset repayment model.

As mentioned above, the intelligent asset management system can implement an intelligent asset repayment model by monitoring a user account to identify post-deadline asset transfers, verifying a user account threshold, and utilizing an asset allocation hierarchy. The intelligent asset management system can identify an asset transfer according to a plurality of user account conditions. Among these user account conditions, the intelligent asset management system can determine that the assets of a user account do not satisfy an asset threshold corresponding to a deadline time. In response to identifying such an account condition, the intelligent asset management system can repeatedly monitor the user account for a post-deadline asset transfer into the user account. Further, the intelligent asset management system can determine whether the post-deadline asset transfer causes the user account to satisfy an additional asset threshold. Upon satisfying this threshold, the intelligent asset management system can transfer user assets according to an asset allocation hierarchy. For instance, the intelligent asset management system can initiate a sequence of transfers according to a base limit value repayment priority, an early access repayment priority, a lending repayment priority, or a revolving credit repayment priority.

The intelligent asset management system provides a variety of technical advantages relative to conventional systems. For example, the intelligent asset management system can improve operational flexibility relative to conventional systems. As an initial matter, the intelligent asset management system provides a variety of different asset repayment models that provides improved flexibility to client devices in managing assets of user accounts. Moreover, as discussed above, the intelligent asset repayment model provides additional improvements in flexibility and functionality in aligning asset transfers to dynamic changes within a user account. Indeed, the intelligent asset management system can automatically repay obligations after time deadlines by monitoring user accounts for particular types of post-deadline asset transfers and then apply an asset allocation hierarchy that flexibly initiates transfers according to the assets in the user account and pre-existing obligations.

Additionally, conventional systems generally fail to distinguish between different classes, or types, of asset transfers in managing user account assets. The intelligent asset management system can identify determined classes of asset transfers and determine account balances to identify when repayment obligations are aligned with determined account thresholds specific to the asset transfer classes. Further, conventional systems cannot simultaneously manage multiple repayment obligations. In contrast, the intelligent asset management system can simultaneously manage multiple repayment obligations by initiating asset transfers according to a determined asset hierarchy providing additional operational functionality over conventional systems.

Additionally, the intelligent asset management system can improve computational efficiency relative to conventional systems. In particular, the intelligent asset management system can implement a variety of asset repayment models through minimal user interactions (e.g., a single click) of a user interface. To illustrate, the intelligent asset management system can efficiently implement complex and detailed management of user account assets through user interaction with a single selectable intelligent asset repayment element. Thus, the intelligent asset management system can preserve limited computing resources by reducing user interactions and user interfaces relative to conventional systems. Indeed, not only are the initial asset management options provided for display in a condensed format as discussed above, but changes implemented by the intelligent asset management system can be provided for display via a digital notification to a user device user interface. In particular, the intelligent asset management system can pair a digital notification with efficient selectable asset management options for making complex and detailed changes to user account asset management.

As indicated by the foregoing discussion, the present disclosure utilizes a variety of terms to describe features and advantages of the intelligent asset management system. For example, as used herein, the term "user account" refers to a database, repository, or digital ledger that includes digital information or assets corresponding to a user. A user account can include entries in a database linked to a client device or user that reflect the assets belonging to the user. Relatedly, the term "user account threshold" (or "asset threshold") refers to a threshold amount of assets of a user account.

Further, as used herein, the term "deadline time" refers to a date/time on which a repayment obligation of a user account is due. Thus, for example, a deadline time for a loan obligation includes a date/time on which the loan repayment is due. Relatedly, the term "post-deadline asset transfer," as used herein, refers to an asset transfer into a user account that occurs after a given deadline time. For example, a post-deadline asset transfer includes a direct deposit received after a loan repayment is due. Further, the term "transfer of assets," as used herein, refers to moving an asset to/from a user account (e.g., to or from a designated destination). An asset transfer can be between a user account and an online banking account, credit account, and other destination/source (e.g., as described in greater detail below).

Additionally, the term "asset allocation hierarchy," as used herein, refers to an ordered set of priorities (e.g., repayment priorities or other priority for allocating monetary resources). The intelligent asset management system can place priorities in a particular order, resulting in a hierarchy of priorities.

Furthermore, as used herein, the term "pre-determined asset transfer class" refers to a set of asset transfer types or categories (e.g., transfer types made prior to the intelligent asset management system implementing an asset repayment model). Asset transfer types can include various asset transfer types into or out of the account. For example, asset transfer types can include an asset transfer by Automated Clearing House (ACH) that comes from certain third-party payers (e.g., employer, payroll provider, or benefits payer). Also, asset transfer types can comprise bank ACH transfers, Pay Friends transfers, and verification or trial deposits from financial institutions. Further, asset transfer types can comprise a deposit by Original Credit Transaction (OCT) from a third-party payer. Additionally, asset transfer types can comprise peer-to-peer transfers from services such as PayPal, Cash App, or Venmo. Moreover, asset transfer types can comprise mobile check deposits, cash loads or deposits, one-time direct deposits, such as tax refunds and other similar transactions.

Moreover, as used herein, the term "asset repayment model" includes a model utilized by the intelligent asset repayment system to initiate asset transfers from a user account to meet repayment obligations. The intelligent asset management system can utilize a variety of asset repayment models. For example, the term "automatic asset repayment model," as used herein, refers to a model used by the intelligent asset repayment system for allocating assets by scheduling an asset transfer from the user account to be initiated on a date corresponding to a deadline time. Additionally, as used herein, the term "intelligent asset repayment model" refers to a model utilized by the intelligent asset repayment system to intelligently allocate assets according to an asset allocation hierarchy (and as further described below). Utilizing the intelligent asset repayment model, the intelligent asset repayment system can repeatedly monitor a user account to identify post-deadline asset transfers into the user account for asset management according to the asset allocation hierarchy. Additionally, with the intelligent asset repayment model, the intelligent asset repayment system can repeatedly monitor a user account after identifying a post-deadline asset transfer to compare the user account assets with a user account threshold.

Further, as used herein, the term "client-initiated asset repayment model" is a model utilized by the intelligent asset repayment system that initiates asset transfers based upon client-initiated transfer requests (e.g., based on user input in addition to user input for selecting the repayment model). For example, a client-initiated asset repayment model can wait for a client device to indicate a date/time to schedule an asset transfer from the user account without aligning the transfer with a corresponding deadline time and/or without identifying a post-deadline asset transfer to a user account.

Additional detail regarding an intelligent asset management system 106 will now be provided with reference to the figures. In particular, FIG. 1 illustrates a schematic diagram of a system environment in which the intelligent asset management system 106 can operate in accordance with one or more embodiments.

As shown in FIG. 1, the environment includes server(s) 102 (which includes an inter-network facilitation system 104 and the intelligent asset management system 106), client device 110, and a network 108. As further illustrated in FIG. 1, the server(s) 102 and the client device 110 can communicate via the network 108. Although FIG. 1 illustrates the intelligent asset management system 106 being implemented by a particular component and/or device within the environment, the intelligent asset management system 106 can be implemented, in whole or in part, by other computing devices and/or components in the environment (e.g., the client device 110). Additional description regarding the illustrated computing devices (e.g., the server(s) 102, the client device 110, and/or the network 108) is provided with respect to FIGS. 10 and 11 below.

As shown in FIG. 1, the server(s) 102 can include the inter-network facilitation system 104. In some embodiments, the inter-network facilitation system 104 can determine, store, generate, and/or display financial information corresponding to a user account (e.g., a banking application, or a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

Indeed, the inter-network facilitation system 104 can include a system that comprises the intelligent asset management system 106 and that facilitates financial transactions and digital communications across different computing systems over one or more networks. For example, an inter-network facilitation system manages credit accounts, secured accounts, and other accounts for a single account registered within the inter-network facilitation system. In some cases, the inter-network facilitation system is a centralized network system that facilitates access to online banking accounts, credit accounts, and other accounts within a central network location. Indeed, the inter-network facilitation system can link accounts from different network-based financial institutions to provide information regarding, and management tools for, the different accounts.

Furthermore, the intelligent asset management system 106 can generate GUIs comprising dynamic user interface elements to receive user input for intelligently transferring assets of a user account according to an asset allocation hierarchy. In particular, the intelligent asset management system 106 can monitor the user account to detect a post-deadline asset transfer into the user account. Further, the intelligent asset management system 106 can determine whether the user account assets are sufficient to initiate a series of transfers for allocating assets from the user account according to an asset allocation hierarchy.

As also illustrated in FIG. 1, the environment includes the client device 110. For example, the client device 110 may include, but is not limited to, a mobile device (e.g., smartphone, tablet) or other type of computing device, including those explained below with reference to FIG. 10. Additionally, the client device 110 can include a computing device associated with (and/or operated by) user accounts for the inter-network facilitation system 104. Moreover, although FIG. 1 illustrates a single client device (e.g., client device 110), the environment can include various numbers of client devices that communicate and/or interact with the inter-network facilitation system 104 and/or the intelligent asset management system 106.

Furthermore, as shown in FIG. 1, the client device 110 includes a client application 112. The client application 112 can include instructions that (upon execution) cause the client device 110 to perform various actions. For example, as shown in FIG. 1, a user of a user account can interact with the client application 112 on the client device 110 to access financial information, initiate a financial transaction, and/or generate GUIs comprising dynamic user interface elements for prompting users to intelligently transfer assets of a user account according to an asset allocation hierarchy.

In certain instances, the client device 110 corresponds to one or more user accounts (e.g., user accounts stored at the server(s) 102). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information, transaction history information, and/or contacts for financial transactions. In some embodiments, a user account can be accessed via multiple devices (e.g., multiple client devices) when authorized and authenticated to access the user account within the multiple devices.

The present disclosure utilizes client devices to refer to devices associated with such user accounts. In referring to a client (or user) device, the disclosure and the claims are not limited to communications with a specific device, but any device corresponding to a user account of a particular user. Accordingly, in using the term client device, this disclosure can refer to any computing device corresponding to a user account of an inter-network facilitation system.

As further shown in FIG. 1, the environment includes the network 108. As mentioned above, the network 108 can enable communication between components of the environment. In one or more embodiments, the network 108 may include a suitable network and may communicate using a various number of communication platforms and technologies suitable for transmitting data and/or communication signals, examples of which are described with reference to FIG. 10. Furthermore, although FIG. 1 illustrates the server(s) 102 and the client device 110 communicating via the network 108, the various components of the environment can communicate and/or interact via other methods (e.g., the server(s) 102 and the client device 110 can communicate directly).

Figure 2:
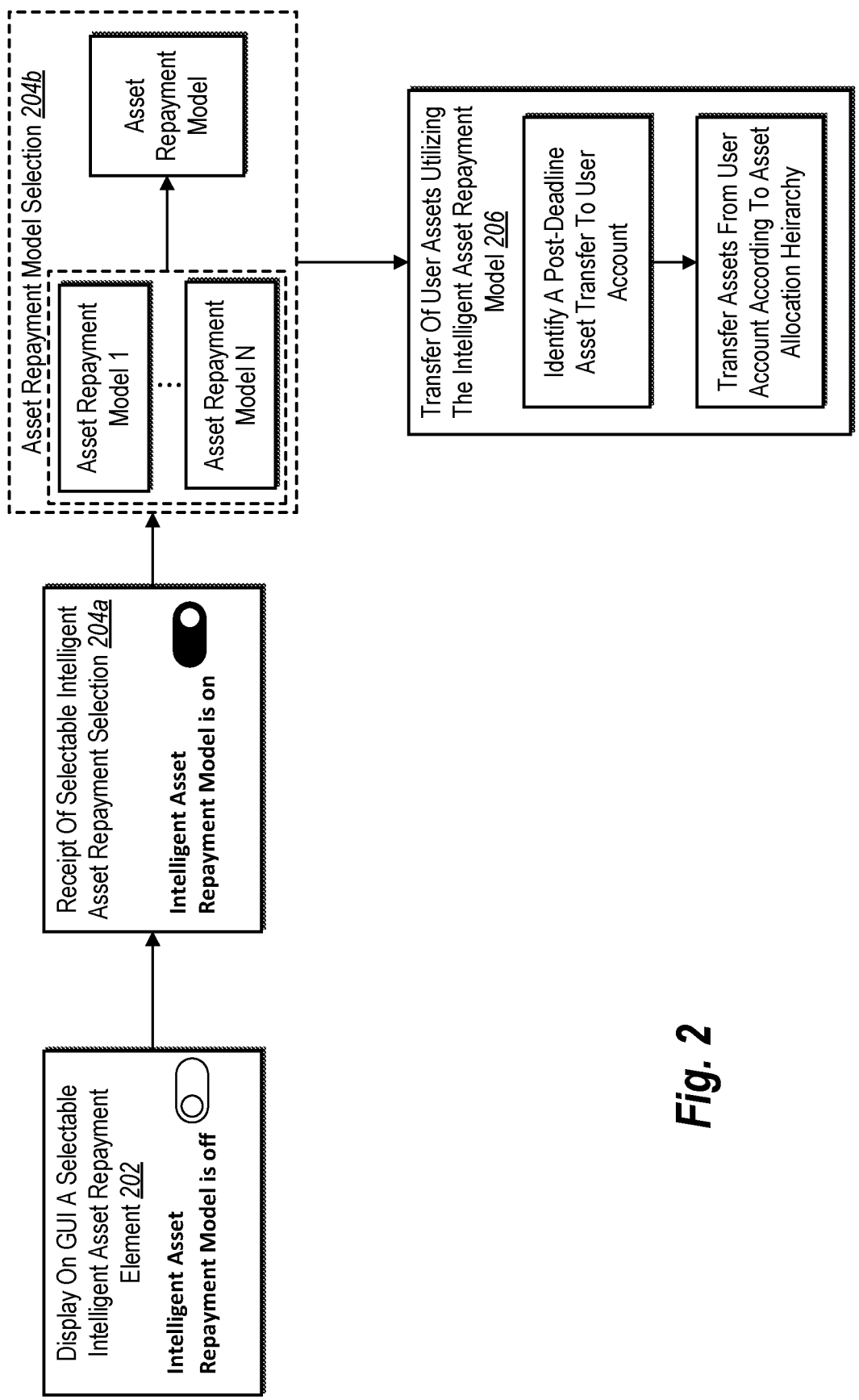
FIG. 2 illustrates an example sequence flow for intelligently managing assets utilizing graphical user interfaces comprising dynamic asset management user interface elements in accordance with one or more embodiments.

As mentioned previously, in one or more implementations, the intelligent asset management system 106 generates graphical user interfaces comprising dynamic user interface elements for prompting users to intelligently transfer assets of a user account according to an asset allocation hierarchy. For example, FIG. 2 illustrates an example sequence flow for intelligently managing assets utilizing graphical user interfaces comprising dynamic asset management user interface elements in accordance with one or more embodiments. In particular, the example sequence flow can include a step 202 of displaying, on a user interface, a selectable intelligent asset repayment element; a step 204a of receiving a selectable intelligent asset repayment selection; a step 204b of selecting an asset repayment model, and a step 206 of transferring user assets utilizing the intelligent asset repayment model.

As shown in the step 202 of FIG. 2, the intelligent asset management system 106 displays dynamic asset management user interface elements (for example, within a GUI of a client device). Thus, a user can easily access asset management options according to the user's needs and/or preferences. In some embodiments, as shown in the step 204a of FIG. 2, the management option displayed in the dynamic asset management user interface element can be a selectable intelligent asset repayment selection.

The selectable intelligent asset repayment selection displayed on a GUI of a client device can provide a user with a streamlined experience for the management of user account assets. The experience is streamlined with respect to conventional systems at least because the number of screens a user must navigate is minimized and the information associated with asset management options presented to the user can be reduced to a smaller area.

Upon receipt of the selectable intelligent asset repayment selection, as shown in the step 204a, the intelligent asset management system 106 can select an asset repayment model, as shown the step 204b of FIG. 2. The intelligent asset management system 106 can determine from the intelligent asset repayment selection in the step 204a, which repayment model to implement. Thus, the intelligent asset management system 106 can select an asset repayment model as shown in step 204b. The intelligent asset management system 106 can utilize a plurality of asset repayment models, including for example an intelligent asset repayment model as will be discussed further in connection with the step 206. Asset repayment models can implement different methods for ensuring that assets associated with the user account are transferred according to the user's needs and/or preferences, as will be discussed in further detail below (e.g., in relation to FIG. 3).

In order for the intelligent asset management system 106 to transfer assets using an asset repayment model, the intelligent asset management system 106 can implement a series of actions as shown in the step 206. In particular, the step 206 illustrates the intelligent asset management system 106 utilizing a specific asset repayment model, namely the intelligent asset repayment model. While other models can be utilized in the step 206, the intelligent asset repayment model is shown in FIG. 2. The step 206 can include, by way of example, and not limitation, actions such as identifying a post-deadline asset transfer to the user account and transferring assets from the user account according to an asset allocation hierarchy.

Identifying a post-deadline asset transfer to the user account will be discussed in further detail below, for example in connection with FIG. 5. Transferring assets from the user account according to an asset allocation hierarchy will also be discussed in further detail below, for example in connection with FIG. 8. In addition to the further steps of identifying a post-deadline asset transfer to the user account and transferring assets from the user account according to an asset allocation hierarchy, additional actions that the intelligent asset management system 106 can take to transfer assets according to the user's needs and/or preferences will also be discussed below.

In some embodiments, the intelligent asset management system 106 can restrict some asset repayment models to users on a case-by-case basis. In particular, the intelligent asset management system 106 can monitor user account data to determine a threshold number of consecutive asset transfers into a user account, a user's risk profile, or other user account data. Accordingly, the intelligent asset management system 106 can use this data to determine whether and when to make available to a user a particular asset repayment model via the display of a generated GUI on a computing device associated with a user account. The intelligent asset management system 106 can thus restrict access to, for example, the intelligent asset repayment model to accounts with a determined number of prior asset transfers into the user account.

Figure 3:
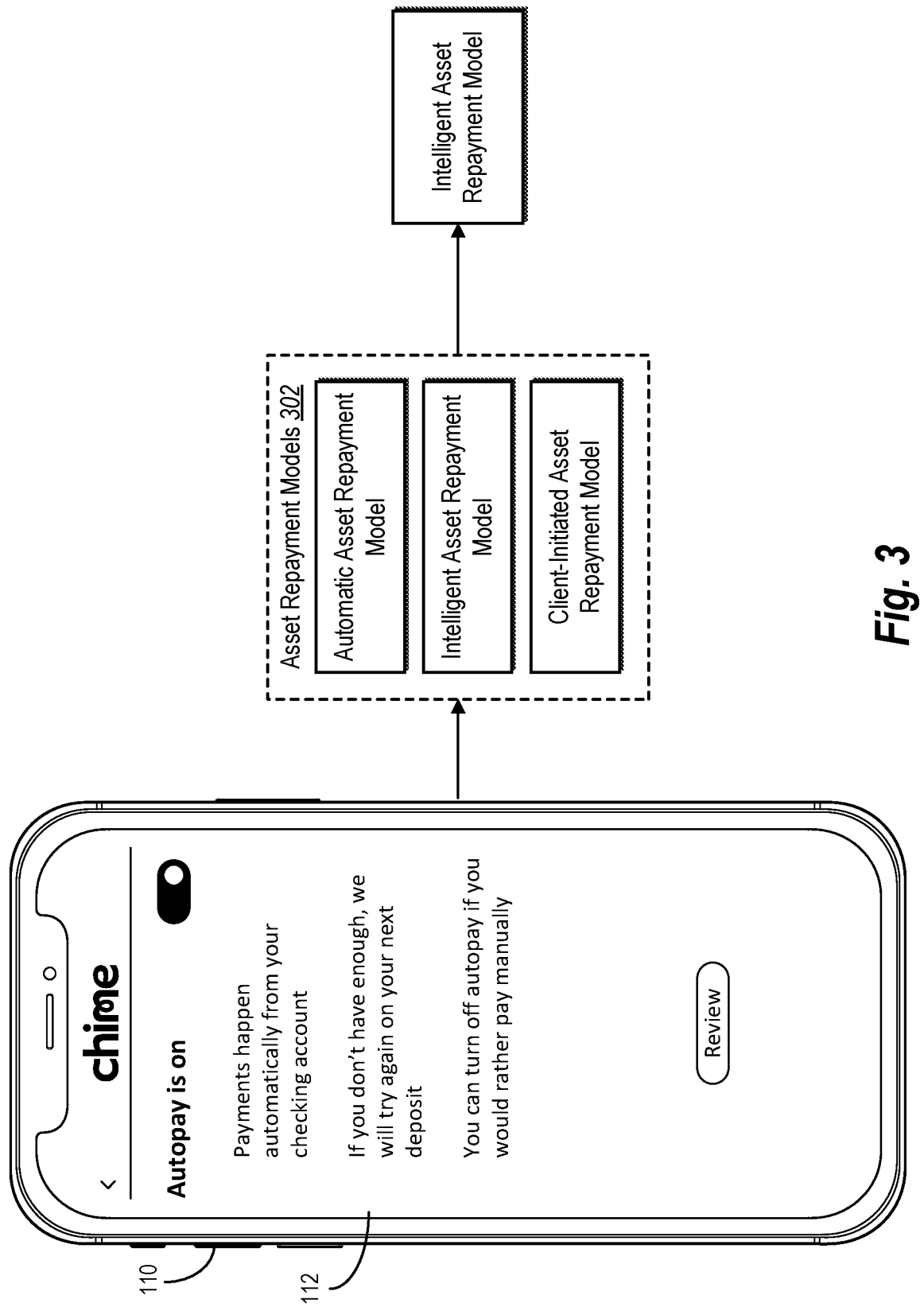
FIG. 3 illustrates an example diagram for selecting an asset repayment model with a dynamic asset management user interface element in accordance with one or more embodiments.

As noted above, the intelligent asset management system 106 can implement a plurality of asset repayment models for selection by a user through a selectable intelligent asset repayment element. For example, FIG. 3 illustrates an example diagram for selecting an asset repayment model with a dynamic asset management user interface element in accordance with one or more embodiments. Accordingly, the intelligent asset management system 106 can generate a selectable intelligent asset repayment element on a GUI associated with a client device as shown in FIG. 3. Further, the intelligent asset management system 106 can also generate for display, on the GUI associated with the client device, asset management information regarding a currently selected asset repayment model or information regarding asset repayment models not currently selected. Thus, a user may manage assets associated with the user account by inputting data into the intelligent asset management system 106 through the generated intelligent asset repayment element displayed on a GUI associated with a client device.

In response to user input to the intelligent asset management system 106 through the selectable intelligent asset repayment element, the intelligent asset management system 106 can then select an asset repayment model from the plurality of asset repayment models. Indeed, asset repayment models 302 can include an automatic asset repayment model (which corresponds to a deadline time), an intelligent asset repayment model, and a client-initiated asset repayment model as shown in FIG. 3. The plurality of asset repayment models can include asset repayment models in addition to those shown in FIG. 3. Each of the asset repayment models comprised within the intelligent asset management system 106 can implement different methods for achieving the management of user assets.

The intelligent asset management system 106 can utilize the automatic asset repayment model to manage assets according to established deadlines. In particular, the intelligent asset management system 106 can identify and/or determine a deadline for a lending repayment obligation associated with the user account using the automatic asset repayment model. Further, the intelligent asset management system 106 can utilize the automatic asset repayment model to schedule an asset transfer from the user account to be initiated on a date corresponding to the date of the deadline.

Also, the intelligent asset management system 106 can utilize the automatic asset repayment model to reschedule an asset transfer from the user account to meet an additional lending repayment obligation. The intelligent asset management system 106 can automatically initiate this asset transfer on a date corresponding to an additional deadline. The intelligent asset management system 106 can take such an action in the event of a user account lacking sufficient assets to meet a lending repayment obligation. The automatic asset repayment model, however, does not include monitoring the user account for post-deadline asset transfers into the user account, unlike the intelligent asset repayment model.

Utilizing the intelligent asset repayment model, the intelligent asset management system 106 can repeatedly monitor the user account to identify post-deadline asset transfers into the user account for asset management. The methods implemented by the intelligent asset management system 106 while utilizing the intelligent asset repayment model will be discussed in further detail below, for example in connection with FIGS. 4-6.

The intelligent asset management system 106 can utilize the client-initiated asset repayment model to implement additional user input for asset management. Indeed, the client-initiated asset repayment model can incorporate user input in addition to the user input received from the user to select an intelligent asset repayment system. Further, the intelligent asset management system 106 can utilize the additional user input collected by utilizing the client-initiated asset repayment model to schedule an asset transfer from the user account without aligning the transfer with a corresponding deadline or identifying a post-deadline asset transfer to a user account. Thus, for example, the client-initiated asset repayment model will not automatically transfer assets from the user account according to a pre-determined schedule or deadline time. Rather, the client-initiated asset repayment model will initiate a transfer upon receiving a request from the client device to initiate the asset transfer.

Moreover, the intelligent asset management system 106 can select a particular asset repayment model from the asset repayment models 302. In some embodiments, as shown in FIG. 3 for example, the intelligent asset management system 106 can select the intelligent asset repayment model for the management of user assets. Accordingly, the intelligent asset management system 106 can implement a series of actions to intelligently manage user assets, for example, utilizing asset transfer classes to identify an asset transfer into the user account.

Figure 4:
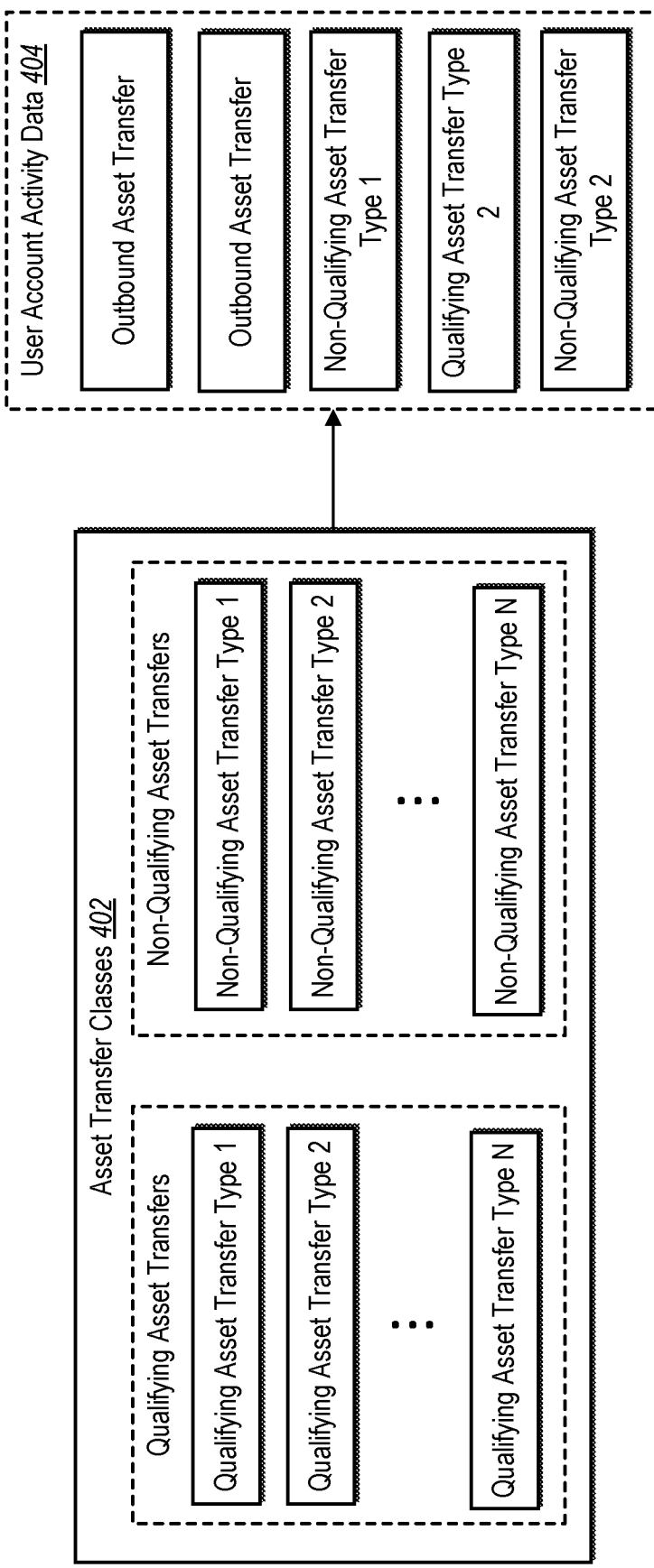
FIG. 4 illustrates an example diagram for identifying a post-deadline asset transfer within user account activity data in accordance with one or more embodiments.

FIG. 4 illustrates an example diagram for monitoring the user account for a post-deadline asset transfer corresponding to a pre-determined asset transfer class. Prior to monitoring the user account for a post-deadline asset transfer, the intelligent asset management system 106 can determine that a lending obligation is delinquent. As noted previously, the intelligent asset management system 106 can utilize the automatic asset repayment model to identify and/or determine a deadline time for a lending repayment obligation associated with the user account. Further, the intelligent asset management system 106 can determine when a lending repayment obligation becomes delinquent, or in other words, when an asset transfer from the user account fails to occur by the deadline time of the lending repayment obligation. When the intelligent asset management system 106 determines that a lending obligation is delinquent, the intelligent asset management system 106 can monitor the user account for a post-deadline asset transfer.

To monitor the user account for a post-deadline asset transfer, the intelligent asset management system 106 utilizes asset transfer classes 402. Accordingly, the intelligent asset management system 106 includes a plurality of asset transfer classes 402, each comprising a plurality of asset transfer types. For example, FIG. 4 illustrates two asset transfer classes, namely qualifying asset transfers and non-qualifying asset transfers. Asset transfer classes 402 can comprise a plurality of asset transfer classes in addition to the two classes shown in FIG. 4. For example, the asset transfer classes 402 can also include outbound asset transfers.

As noted above, each asset transfer class can comprise a plurality of asset transfer types. For example, both qualifying asset transfers and non-qualifying asset transfers can include a plurality of asset transfer types as shown in FIG. 4 where the qualifying asset transfer class comprises qualifying asset transfer type 1, qualifying asset transfers type 2, through qualifying asset transfers type N and the non-qualifying asset transfer class comprises non-qualifying asset transfer type 1, non-qualifying asset transfer type 2, through non-qualifying asset transfer type N. The asset transfer classes can be utilized by the intelligent asset management system 106 when monitoring the user account to identify asset transfers within the user account activity data 404.

As noted previously, when the intelligent asset management system 106 determines that a lending obligation is delinquent, the intelligent asset management system 106 can monitor the user account for a post-deadline asset transfer to determine further actions. To monitor the user account for a post-deadline asset transfer, the intelligent asset management system 106 can utilize asset transfer classes 402 to identify events within the user account activity data 404 and determine an action based on the identified events. For example, the user account activity data 404 can include events such as outbound asset transfers, non-qualifying asset transfers, and qualifying asset transfers, as shown in FIG. 4. Upon identifying the asset transfer types and asset transfer classes of a given event in the user account activity data 404, the intelligent asset management system 106 can determine an action based on the event identification.

In one or more implementations, the intelligent asset management system 106 initiates actions based on determining that a user account activity event stems from a particular asset transfer class. For example, for asset transfers falling within the class of qualifying asset transfers, the intelligent asset management system 106 can initiate monitoring of a user account balance to determine whether the user account satisfies an asset threshold corresponding to a lending repayment obligation. Further, for asset transfers falling within the class of non-qualifying asset transfers or for outbound asset transfers, the intelligent asset management system 106 can, by way of example, and not limitation, take no action, or continue to monitor the user account activity data 404. The particular actions initiated can vary according to the particular embodiment.

An "asset threshold," refers to a threshold amount of assets of a user account. The intelligent asset management system 106 can determine an asset threshold of a user account necessary to initiate a given asset transfer. Further, the intelligent asset management system 106 can determine the asset threshold for a given asset transfer corresponding to a repayment priority by identifying the amount of the repayment obligation corresponding to the repayment priority. Indeed, the intelligent asset management system 106 can determine whether to initiate an asset transfer based on the amount of assets in a user account in relation to the asset threshold. In some embodiments, the intelligent asset management system 106 can initiate the transfer if the amount of assets in the user account is equal to, or greater than the asset threshold. In some implementations, the intelligent asset management system 106 can initiate a transfer for an amount less than the repayment obligation for a partial repayment if the amount of the assets in the user account is less than the asset threshold.

In some embodiments, qualifying asset transfers can comprise an asset transfer by Automated Clearing House (ACH) that comes from certain third-party payers (e.g., employer, payroll provider, or benefits payer). Further, qualifying asset transfers can comprise a deposit by Original Credit Transaction (OCT) from a third-party payer. In some embodiments, non-qualifying asset transfers can comprise bank ACH transfers, Pay Friends transfers, and verification or trial deposits from financial institutions. Additionally, non-qualifying asset transfers can comprise peer-to-peer transfers from services such as PayPal, Cash App, or Venmo. Also, non-qualifying asset transfers can comprise mobile check deposits, cash loads or deposits, one-time direct deposits, such as tax refunds and other similar transactions.

In some embodiments, the intelligent asset management system 106 can determine whether an asset transfer of one class merits being counted as an asset transfer of another on a case-by-case basis. This determination may be made on a number of data points associated with the asset transfer such as, by way of example, and not limitation, the size of the asset transfer. For example, if an individual non-qualifying asset transfer satisfies an asset threshold, the intelligent asset management system 106 can determine that the individual non-qualifying asset transfer will be treated as a qualifying asset transfer. Accordingly, upon such a determination, the intelligent asset management system 106 can initiate a transfer according to an asset allocation hierarchy. In some embodiments, in response to an asset transfer into the user account of any of the asset transfer classes 402, the intelligent asset management system 106 can determine whether a user account meets an asset threshold sufficient to initiate an asset transfer from the user account.

To summarize FIG. 4, the intelligent asset management system 106 can monitor the user account activity data 404 for asset transfers corresponding to pre-determined asset transfer classes 402 to facilitate the transfer of user assets.

Figure 5:
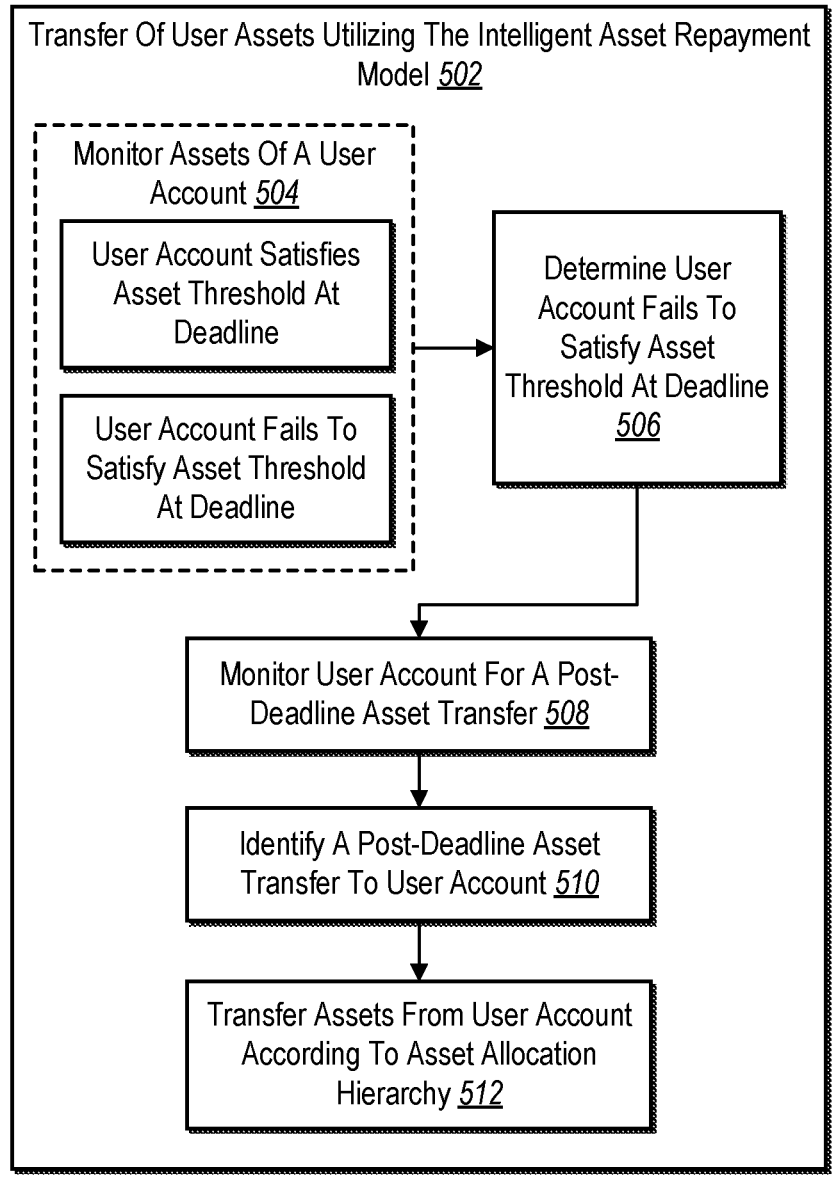
FIG. 5 illustrates an example diagram for transferring user assets utilizing an intelligent asset repayment model in accordance with one or more embodiments.

FIG. 5 illustrates an example diagram for transferring user assets utilizing an intelligent asset repayment model in accordance with one or more embodiments. In a step 502 of transferring user assets utilizing an intelligent asset repayment model, the intelligent asset management system 106 can monitor a user account to determine whether the account satisfies an asset threshold at a deadline in a step 504. The deadline can correspond to a lending repayment obligation (e.g., a loan with a payment deadline) as discussed previously. In some embodiments, if the intelligent asset management system 106 determines, in a step 506, that the user account satisfies an asset threshold at the deadline, the intelligent asset management system 106 can initiate a transfer from the user account to meet the lending repayment obligation. In some embodiments, if the intelligent asset management system 106 determines that the user account fails to satisfy an asset threshold at the deadline, in a step 508, the intelligent asset management system 106 can monitor the user account for a post-deadline asset transfer.

To monitor the user account for a post-deadline asset transfer, the intelligent asset management system 106 can utilize asset transfer classes 402 to monitor the user account activity data 404 as discussed previously in connection with FIG. 4. Further, when the intelligent asset management system 106 identifies, in a step 510, a post-deadline asset transfer to the user account, the intelligent asset management system 106 can also identify the asset transfer type and class as mentioned previously. Again, the identified asset transfer class of the user account event can determine an action the intelligent asset management system 106 can take as noted in regard to FIG. 4.

For example, in response to identifying the post-deadline asset transfer, in a step 512 the intelligent asset management system 106 can initiate a digital transfer of assets from the user account. The intelligent asset management system 106 can initiate this digital transfer of assets according to an asset allocation hierarchy as will be discussed further, for example in relation to FIG. 8. The asset allocation hierarchy of the intelligent asset management system 106 can include, for example, a transfer of assets to satisfy a delinquent lending repayment obligation or other repayment priorities as will be discussed further, also in relation to FIG. 8.

In some embodiments, the intelligent asset management system 106 will maintain the amount of the post-deadline asset transfer consistent with the intended amount of the asset transfer at the deadline. For example, the asset transfer at the deadline can be for a specific amount, such as to meet a lending repayment obligation. In cases where the asset threshold was not met at the deadline, the intelligent asset management system 106 can maintain that same amount for transfer of assets from the user account, as in the step 512, upon identification of a post-deadline asset transfer to the user account, as in the step 510. Accordingly, if the user account remains below the asset threshold after the intelligent asset management system 106 identifies a post-deadline asset transfer in the step 510, the intelligent asset management system 106 can refrain from initiating an asset transfer for a lesser amount. In some embodiments, however, the post-deadline asset transfer amount can vary from the amount of the intended asset transfer at the deadline as will be discussed further in connection with FIG. 6.

Additionally, the intelligent asset management system 106 can monitor user account data to determine scenarios in which to restrict the transfer of assets. For example, if the intelligent asset management system 106 determines that a user account lending repayment obligation is delinquent and that the date of arrival of a post-deadline asset transfer to the user account corresponds with the date of an additional deadline, the intelligent asset management system 106 can prevent the transfer of user assets utilizing the intelligent asset repayment model, according to the step 512, on that date. Similarly, the intelligent asset management system 106 can prevent the manual transfer of user assets by a user if the intelligent asset management system 106 is already processing an asset transfer through another asset repayment model such as the intelligent asset repayment model, for example as in the step 512.

In some embodiments, the intelligent asset management system 106 can transfer assets from a user account in response to a pre-deadline asset transfer even when a repayment obligation, for example a lending repayment obligation, is not delinquent. For example, a user may authorize, by user inputs into the intelligent asset management system-generated GUI, a transfer of assets by the intelligent asset management system 106 before a repayment obligation is delinquent. In particular, upon receiving this user input, the intelligent asset management system 106 can monitor the user account for an asset transfer into the user account, identify a pre-deadline asset transfer, and determine whether the user account satisfies an asset threshold in response to the pre-deadline asset transfer. Further, the intelligent asset management system 106 can transfer assets from the user account according to an asset allocation hierarchy upon determining that the user account satisfies the asset threshold. Determining whether a user account satisfies an asset threshold in response to a pre-deadline asset transfer is similar to determining whether a user account satisfies an asset threshold in response to a post-deadline asset transfer prior to transferring user assets.

Figure 6:
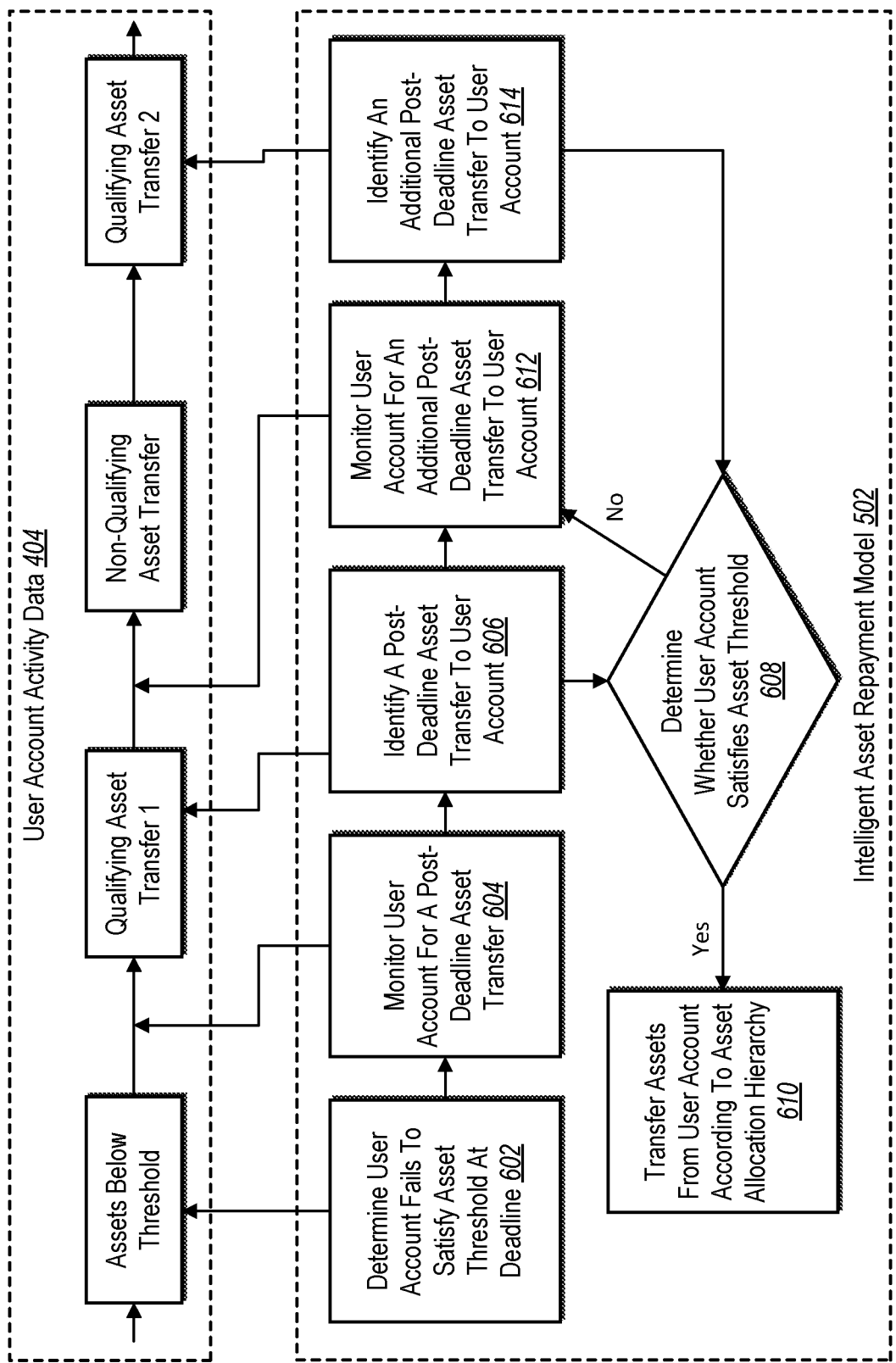
FIG. 6 illustrates an example diagram for determining that assets satisfy a threshold prior to transferring user assets via an intelligent asset repayment model in accordance with one or more embodiments.

For example, FIG. 6 illustrates an example diagram for determining that assets satisfy a threshold prior to transferring user assets via an intelligent asset repayment model in accordance with one or more embodiments. Utilizing the intelligent asset repayment model, the intelligent asset management system 106 can monitor the user account activity data 404 to intelligently manage user assets. For example, in a step 602, the intelligent asset management system 106 can determine that a user account fails to satisfy an asset threshold identified and/or determined to meet a repayment obligation at a deadline while monitoring the user account activity data 404. This failure can result from user account assets being below the asset threshold, for example. Upon determining that the user account failed to satisfy the asset threshold at the deadline, in a step 604 the intelligent asset management system 106 can monitor the user account activity data 404 for a post-deadline asset transfer.

Upon receipt of a post-deadline asset transfer, for example qualifying asset transfer 1 as shown in FIG. 6, in a step 606 the intelligent asset management system 106 can identify the receipt of and the asset transfer class of the post-deadline asset transfer as discussed previously. Upon identifying a qualifying post-deadline asset transfer, in a step 608 the intelligent asset management system 106 can determine whether the user account satisfies the asset threshold. If the intelligent asset management system 106 determines that the user account satisfies the asset threshold, in a step 610 the system can transfer assets from the user account according to an asset allocation hierarchy. If, however, the intelligent asset management system 106 determines that the user account fails to satisfy the asset threshold, in a step 612 the intelligent asset management system 106 can monitor the user account activity data 404 for an additional post-deadline asset transfer to the user account.

If (at a step 614) the intelligent asset management system 106 identifies a non-qualifying asset transfer, the intelligent asset management system 106 will continue to monitor the user account in the step 612. For example, during monitoring of the user account activity data 404, the intelligent asset management system 106 may identify a non-qualifying asset transfer. If the intelligent asset management system 106 identifies an asset transfer within the non-qualifying asset transfer class, for example, the non-qualifying asset transfer shown in FIG. 6, the intelligent asset management system 106 can continue to monitor the user account for post-deadline asset transfers to the user account in the step 612.

In response to identifying an additional qualifying post-deadline asset transfer, for example qualifying asset transfer 2 as shown in FIG. 6, in the step 608 the intelligent asset management system 106 can determine whether the user account satisfies the asset threshold. If the intelligent asset management system 106 determines that the asset threshold is met, in the step 610 the intelligent asset management system 106 can initiate an additional asset transfer from the user account according to the asset allocation hierarchy. If, however, the intelligent asset management system 106 determines that the user account still does not satisfy the asset threshold, in the step 612 the intelligent asset management system 106 can again monitor the user account for an additional post-deadline asset transfer to the user account as shown in FIG. 6 or can take other action.

Among the other actions the intelligent asset management system can take after determining that a user account does not satisfy an asset threshold, the intelligent asset management system 106 can postpone monitoring of user account activity data. In some embodiments, the intelligent asset management system 106 can monitor the user account activity data 404 of a user account iteratively with a delay between each iteration. For example, the intelligent asset management system 106 can monitor the user account twice after identifying a post-deadline qualifying asset transfer with a time delay between each iteration. If after each iteration the intelligent asset management system 106 determines that the user account does not satisfy the asset threshold in the step 608, the intelligent asset management system 106 can postpone further monitoring. The intelligent asset management system 106 can maintain this postponement until a defined event occurs.

Such defined events may include, by way of example, and not limitation, determining that the user account has failed to satisfy an additional threshold at an additional deadline, or identifying an additional qualifying asset transfer into the user account. In the event that the intelligent asset management system 106 postpones until an additional deadline, or in other words the next deadline, the corresponding additional asset threshold, or in other words the next asset threshold, can include the sum of the asset threshold and the next asset threshold.

In some embodiments, the intelligent asset management system 106 can prevent transfer of assets through a user-selected asset repayment model if other transactions are scheduled in conflict with the intelligent asset management system 106 asset transfers. For example, the intelligent asset management system 106 can identify scheduled transactions associated with the user account. Upon identifying such a scheduled transaction, the intelligent asset management system 106 can prevent or delay the initiation of asset transfers through a selected asset repayment model, for example, the intelligent asset repayment model.

In some embodiments, the intelligent asset management system 106 can initiate a transfer to partially meet a repayment obligation. For example, the intelligent asset management system 106 can determine an acceptable account liquidity threshold to remain in the user account after any asset transfer out of the user account. Upon determining this acceptable account liquidity threshold, the intelligent asset management system 106 can identify the asset transfer amount as the difference between the total assets in the account and the acceptable account liquidity threshold. The intelligent asset management system 106 can then transfer assets utilizing an asset repayment model in the step 610 as discussed above.

To determine an acceptable account liquidity threshold, the intelligent asset management system 106 can draw from user account data. For example, the intelligent asset management system 106 can utilize user account data such as the number, frequency, and regularity of asset transfers into the user account, the user's repayment history, the number and amount of repayment obligations associated with the user account, and other user account data. Further, in some embodiments, a user can input the acceptable account liquidity threshold, or directly determine an asset transfer amount for a given deadline. In such cases, the intelligent asset management system 106 will proceed as discussed previously by utilizing these user inputs.

Figure 7:
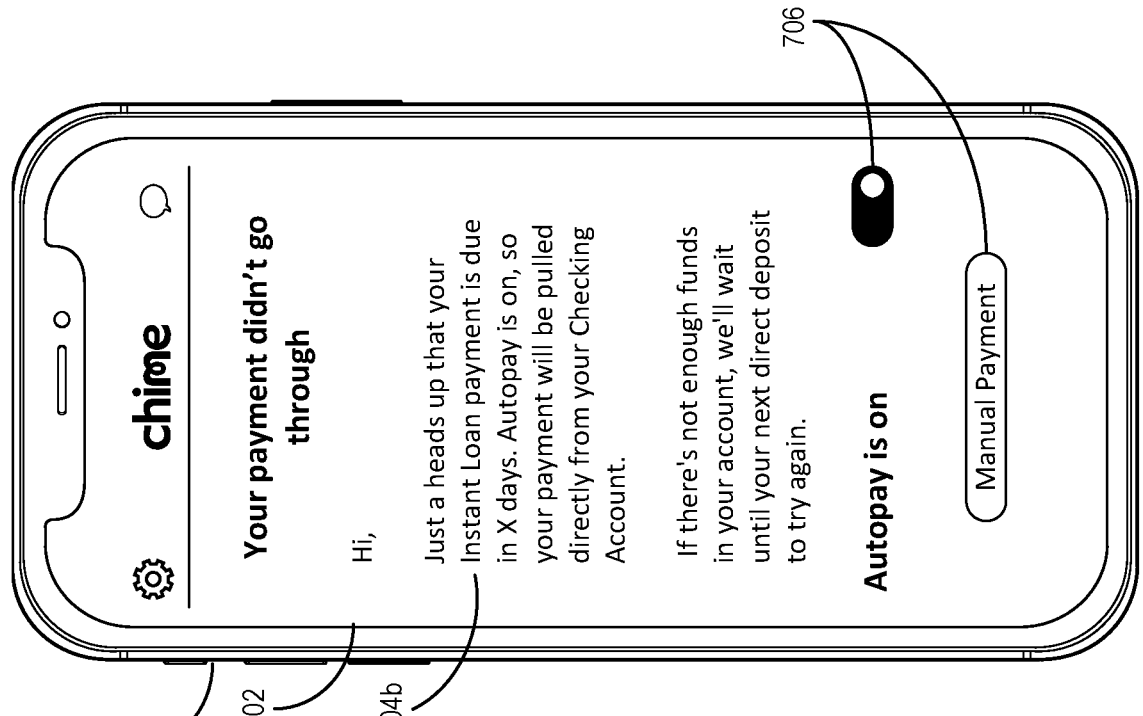
FIG. 7 illustrates example graphical user interfaces including digital notifications and dynamic asset management user interface elements in accordance with one or more embodiments.
Figure 7:
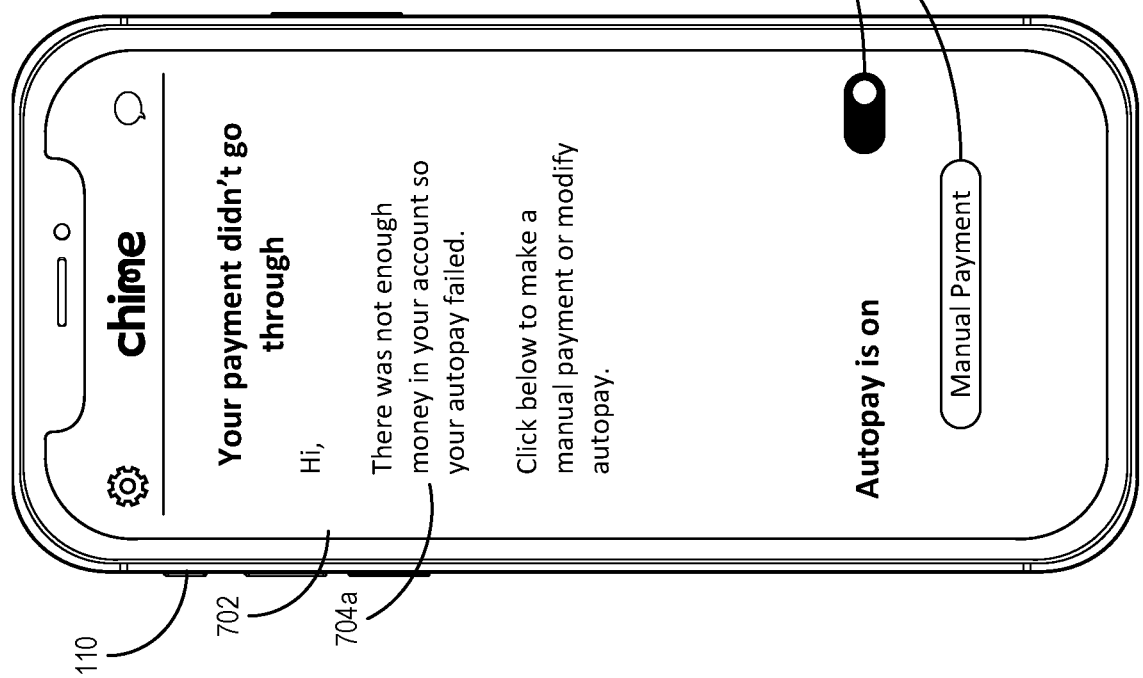

FIG. 7 illustrates example graphical user interfaces including digital notifications and dynamic asset management user interface elements in accordance with one or more embodiments. In some embodiments, the intelligent asset management system 106 can generate and provide for display digital notifications 704*a*, 704*b* on a user interface 702 of a client device (e.g., the client device 110). Furthermore, the digital notifications can indicate, by way of example, and not limitation, that failure of the user account to satisfy an asset threshold corresponding to a deadline time will initiate a digital transfer of assets at a later time, as in the notification 704*b*. For example, the digital transfer of assets may be initiated upon receipt of a post-deadline asset transfer into the user account.

Additionally, the intelligent asset management system 106 can generate a GUI that further comprises dynamic asset management user interface elements 706 to be displayed with the digital notifications. For instance, the intelligent asset management system 106 can generate the dynamic asset management user interface elements 706 and provide those elements for display with the digital notifications 704*a*, 704*b*. For example, the intelligent asset management system 106 can provide for display via the computing device with the digital notifications 704*a*, 704*b* a selectable option to change to a different asset repayment model from the plurality of asset repayment models as in the dynamic asset management user interface elements 706.

The intelligent asset management system 106 can provide the digital notifications 704*a*, 704*b* to a computing device, such as a client device, at a variety of times. For example, the intelligent asset management system 106 can provide a digital notification indicating that failure of the user account to satisfy an asset threshold corresponding to a deadline time will initiate a digital transfer of assets prospectively to, retrospectively to, or at the time of this failure. For example, the intelligent asset management system 106 can monitor the client account prior to the deadline and determine whether the user account is likely to satisfy the asset threshold at the deadline time. If the user account is unlikely to satisfy the asset threshold, a digital notification may be generated for display on a GUI of a client device to notify a user of the upcoming deadline, for example as shown in the digital notification 704*b*. Further, the digital notification can indicate that the user account does not currently satisfy the threshold and that the digital transfer will not be initiated until an asset transfer is received into the user account. Thus, the intelligent asset management system 106 can provide the digital notification for display prospectively to the failure of an asset threshold corresponding to the deadline.

Additionally, as noted above, the intelligent asset management system 106 can also provide a digital notification for display retrospectively to or at the time of failure of an asset threshold corresponding to the deadline. For example, the intelligent asset management system 106 can provide a digital notification at the time of the failure of an asset threshold corresponding to the deadline indicating that the asset threshold was not met and that the digital transfer will be initiated after an asset transfer is received into the user account. Similarly, at any time after the deadline, the intelligent asset management system 106 can provide a digital notification that the user account failed to satisfy the asset threshold corresponding to the deadline and that the digital transfer will be initiated after a post-deadline asset transfer is received into the user account.

In each of the cases above, namely providing the digital notification prospectively to, retrospectively to, or at the time of failure of the user account to satisfy the asset threshold at the time of the deadline, the intelligent asset management system 106 can further provide for display with the digital notification, the dynamic asset management user interface elements 706. As noted above these elements can provide selectable options to a user, for example, providing a selectable option to change to a different asset repayment model from the plurality of asset repayment models.

In some embodiments, the intelligent asset management system 106 can determine an anticipated asset transfer into the user account to provide digital notifications and account management options to a user. For example, the intelligent asset management system 106 may utilize user account data such as past asset transfers into the user account, dates of qualifying asset transfers into the account, the timing between qualifying asset transfers into the account, and any other user account data to predict an anticipated asset transfer into the user account. Further, the intelligent asset management system 106 can also incorporate in the prediction model data that affects transfers into user accounts that may not typically be associated with the user account such as federal and state holidays, bank schedules, or other data to determine a date of a predicted asset transfer into the user account. Utilizing this predicted date of the next asset transfer into the account, the intelligent asset management system 106 can generate a digital notification for display on a GUI associated with the user account. Via the digital notification, the intelligent asset management system 106 can inform a user of an upcoming transfer of assets from the user account in response to the anticipated receipt of a post-deadline asset transfer.

Various models can be used for predicting asset transfers into the user account and providing notifications of such to a client device. For example, in one or more embodiments, the intelligent asset management system 106 can intelligently transmit pre-emptive digital notifications to client devices across computer networks by utilizing machine learning models. For instance, the intelligent asset management system 106 can utilize a trained availability prediction machine learning model (e.g., a decision tree model or neural network) to generate a digital asset availability prediction for a client account. Similarly, the intelligent asset management system 106 can generate a digital intent classification for the client account utilizing an intent prediction machine learning model. In one or more implementations, the intelligent asset management system 106 can leverage the digital intent classification and/or the digital asset availability prediction to transmit a pre-emptive digital notification to a client device corresponding to the client account. Indeed, in one or more embodiments, the intelligent asset management system 106 can utilize the trained availability prediction machine learning model (e.g., a decision tree model or neural network) and/or the digital intent classification for the client account utilizing an intent prediction machine learning model as described in U.S. application Ser. No. 18/333,884, filed Jun. 13, 2023, entitled UTILIZING MACHINE LEARNING MODELS TO INTELLIGENTLY TRANSMIT PREEMPTIVE DIGITAL NOTIFICATIONS TO CLIENT DEVICES ACROSS COMPUTER NETWORKS, the contents of which are herein incorporated by reference in their entirety. In this manner, the intelligent asset management system can anticipate asset transfers, such as direct deposits, and perform a variety of actions, such as transmitting digital notifications regarding post-deadline asset transfers, prepare an asset transfer from the user account based on the predicted direct deposit, and/or initiate an asset transfer prior to receiving the predicted direct deposit.

Additionally, the intelligent asset management system 106 can generate GUIs that further comprise the dynamic asset management user interface elements 706 and display those elements with the digital notifications 704a, 704b of an anticipated receipt of a post-deadline asset transfer. The intelligent asset management system 106 can generate the dynamic asset management user interface elements 706 and display those elements as selectable options with the digital notifications 704a, 704b. For example, the intelligent asset management system 106 can provide selectable options for display via the client device with the digital notifications 704a, 704b and can include a selectable option to change to a different asset repayment model from the plurality of asset repayment models.

As discussed above, the intelligent asset management system 106 can initiate a digital asset transfer in response to a variety of determinations. For example, the intelligent asset management system 106 can initiate a digital asset transfer in response to determining that a post-deadline asset transfer has been received into the user account and that the user account satisfies an asset threshold. As mentioned above, the intelligent asset management system 106 can transfer assets according to an asset allocation hierarchy.

Figure 8:
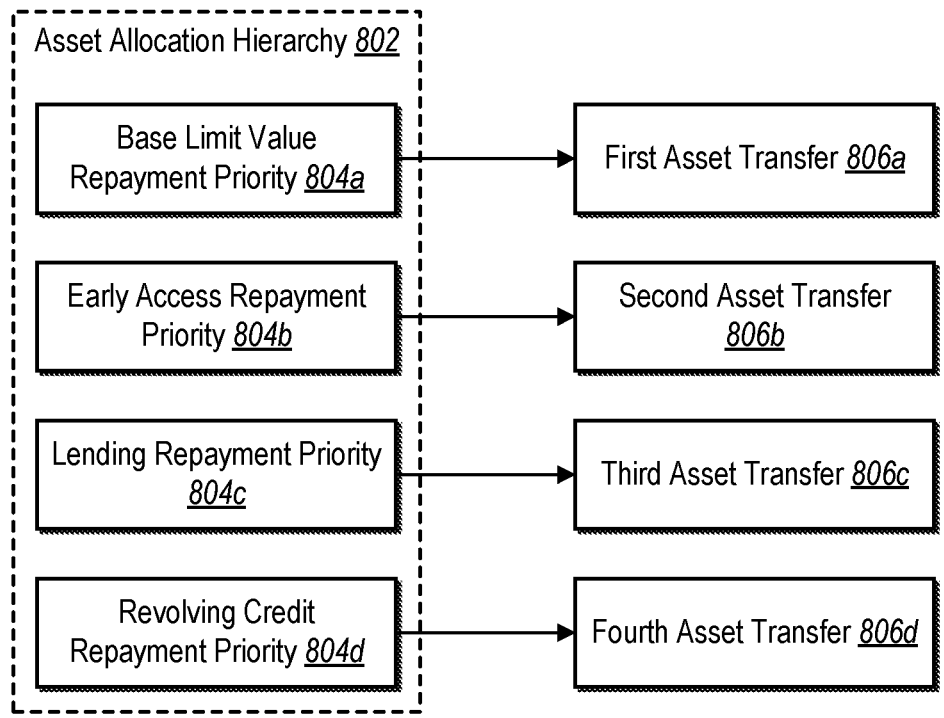
FIG. 8 illustrates an example diagram for transferring assets according to an asset allocation hierarchy in accordance with one or more embodiments.

FIG. 8 illustrates an example diagram for transferring assets according to an asset allocation hierarchy 802 in accordance with one or more embodiments. Accordingly, the asset allocation hierarchy 802 can comprise a variety of repayment priorities 804 including a base limit value repayment priority 804a, an early access repayment priority 804b, a lending repayment priority 804c, and a revolving credit repayment priority 804d. Each repayment priority can correspond to an asset transfer, such as a first asset transfer 806a, a second asset transfer 806b, a third asset transfer 806c, and/or a fourth asset transfer 806d as shown in FIG. 8.

The intelligent asset management system 106 can assign repayment priorities 804 to repayment obligations associated with the user account. For instance, in some embodiments, the intelligent asset management system 106 can determine that a user account has a variety of repayment obligations such as, by way of example, and not limitation, repayment obligations associated with a penalty-free overdraft, early access to money before the money arrives, a loan, a fee-free credit withdrawal, or other repayment obligation. For example, the base limit value repayment priority 804a can be assigned to an obligation to repay an amount of a penalty-free overdraft. In particular, the penalty-free overdraft can include a monetary overdraft amount that a user account is permitted to obtain or transact in excess of an amount belonging to the user account. Additionally, the intelligent asset management system 106 can utilize a variety of machine learning models and a base limit value model to generate user interface elements that transparently and efficiently present current and future base limit values for user accounts as described in U.S. application Ser. No. 17/519,129, filed Nov. 4, 2021, entitled GENERATING USER INTERFACES COMPRISING DYNAMIC BASE LIMIT VALUE USER INTERFACE ELEMENTS DETERMINED FROM A BASE LIMIT VALUE MODEL, the contents of which are herein incorporated by reference in their entirety.

Further, the early access repayment priority 804b can be assigned to an obligation to repay early access of a user account to money before the money arrives in the user account. In particular, money can be available in a user account when the user account includes data indicating money will be received into the account. For example, the amount, or a portion of the amount, of a pending transfer into the account can be available prior to the user account actually receiving the money. Additionally, the lending repayment priority 804c can be assigned to an obligation to repay a loan. The loan may be for any purpose, such as a personal loan, a home equity loan, a loan for building credit, and any other kind of loan. Moreover, the revolving credit repayment priority 804d can be assigned to an obligation to repay a credit obligation, such as an amount owed on a credit account (e.g., a credit card). In some implementations, the revolving credit repayment priority 804d includes an amount owed for a credit account secured by a checking or debit account. Thus, for example, the intelligent asset management system 106 can establish a credit-builder account where the amount of credit available under the credit-builder account is tied to the amount of a secured account. The amount in the secured account can be utilized to pay credit for the credit-builder account. If any additional amounts remain, the intelligent asset management system 106 can utilize the revolving credit repayment priority 804d to repay an outstanding balance in the credit-builder account.

In particular, the intelligent asset management system 106 can determine whether a user account is subject to a variety of repayment obligations and assemble the asset allocation hierarchy 802 with corresponding repayment priorities 804. The intelligent asset management system 106 includes a repayment priority within the asset allocation hierarchy 802 corresponding to each repayment obligation determined. Indeed, if the intelligent asset management system 106 determines that a user account is subject to a base limit value repayment obligation, the base limit value repayment priority 804a is included within the asset allocation hierarchy 802, if the intelligent asset management system 106 determines that a user account is subject to an early access repayment obligation, the early access repayment priority 804b is included within the asset allocation hierarchy 802, and so forth.

The intelligent asset management system 106 also determines the order of the repayment priorities 804 within the asset allocation hierarchy 802 and, therefore, the initiation order of the asset transfers 806. For example, the order of the repayment priorities 804 can be first to last from top to bottom, as shown in FIG. 8. Hence, in FIG. 8, the base limit value repayment priority 804a can be the first, or highest priority, the early access repayment priority 804b can be the second priority, the lending repayment priority 804c can be the third priority, and the revolving credit repayment priority 804d can be the fourth priority. Thus, when the intelligent asset management system 106 initiates the digital transfer of assets from the user account, the intelligent asset management system 106 can utilize the asset allocation hierarchy 802 to initiate an asset transfer corresponding to each repayment priority within the asset allocation hierarchy 802 as shown in FIG. 8. For example, when the intelligent asset management system 106 includes the base limit value repayment priority 804a as a first priority within the asset allocation hierarchy 802, the first asset transfer 806a is initiated, when the intelligent asset management system 106 includes the early access repayment priority 804b as a second priority within the asset allocation hierarchy 802, the second asset transfer 806b is initiated, when the intelligent asset management system 106 includes the lending repayment priority 804c as a third priority within the asset allocation hierarchy 802, the third asset transfer 806c is initiated, and when the intelligent asset management system 106 includes the revolving credit repayment priority 804d as a fourth priority within the asset allocation hierarchy 802, the fourth asset transfer 806d is initiated, and so forth.

Further, in some embodiments, the intelligent asset management system 106 can put a higher repayment priority on hold to initiate a transfer corresponding to lower repayment priorities 804. For example, in the case of a larger obligation prioritized above a smaller obligation, the intelligent asset management system 106 can determine that the user account satisfies an asset threshold necessary to initiate a transfer for the smaller obligation, but not the larger obligation. In such a case, the intelligent asset management system 106 can skip the higher repayment priority with the larger repayment obligation to initiate transfers corresponding to lower repayment priorities 804 until the user account can satisfy an asset threshold corresponding to the larger repayment obligation of the higher repayment priority. For example, when initiating the digital asset transfer of assets from the user account according to the asset allocation hierarchy 802, the intelligent asset management system 106 can initiate, for example, either the third asset transfer 806c according to the lending repayment priority 804c, or the fourth asset transfer 806d according to the revolving credit repayment priority 804d.

The intelligent asset management system 106 can determine which of the repayment priorities 804 within the asset allocation hierarchy 802 should be used to initiate digital asset transfers on a variety of user account data points. In the example of the foregoing paragraph, for instance, the intelligent asset management system 106 utilized the user account data point of the sufficiency of the user account in connection with the size of the repayment obligation to determine whether to skip a repayment priority. The intelligent asset management system 106, however, can utilize any relevant user account data point in connection with the asset allocation hierarchy 802 to modulate the repayment priorities 804 and their corresponding asset transfers 806 to intelligently manage user assets.

In some embodiments, the repayment priorities 804 identified in the asset allocation hierarchy 802 of FIG. 8, may include sub-repayment priorities which are further organized hierarchically within the asset allocation hierarchy 802. For example, multiple lending repayment priorities 804c can be associated with a single user account. In such cases, the intelligent asset management system 106 can utilize user account data, including lending repayment obligation data such as interest rates, amounts, and terms, to further determine the priorities within the asset allocation hierarchy 802 of the sub-repayment priorities.

FIGS. 1-8, the corresponding text, and the examples provide a number of different systems, methods, and non-transitory computer readable media for intelligently managing assets utilizing dynamic asset management user interface elements and digital notifications displayed on a graphical user interface. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
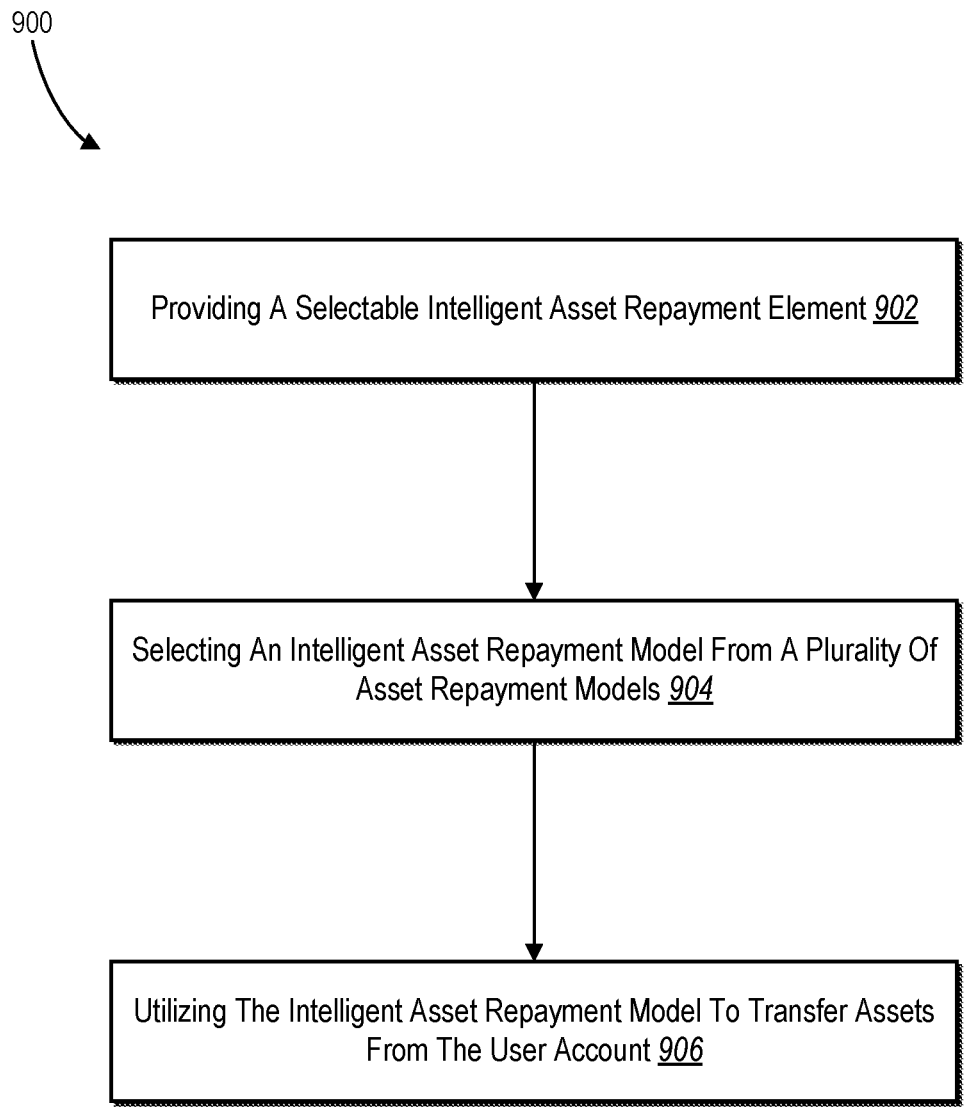
FIG. 9 illustrates an example series of acts for intelligently managing assets utilizing dynamic asset management user interface elements and digital notifications displayed on a graphical user interface in accordance with one or more embodiments.

While FIG. 9 illustrates acts according to some embodiments, alternative embodiments may omit, add to, reorder, and/or modify any of the acts shown in FIG. 9. The acts of FIG. 9 can be performed as part of a method (e.g., a computer-implemented method). Alternatively, a non-transitory computer readable medium can comprise instructions, that when executed by one or more processors (e.g., at least one processor), cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for intelligently managing assets utilizing dynamic asset management user interface elements and digital notifications displayed on a graphical user interface. The series of acts 900 can include an act 902 of providing a selectable intelligent asset repayment element; an act 904 of selecting an intelligent asset repayment model from a plurality of asset repayment models; and an act 906 of utilizing the intelligent asset repayment model to transfer assets from the user account.

For example, in one or more embodiments, the acts 902-906 include providing, for display within a graphical user interface of a computing device corresponding to a user account, a selectable intelligent asset repayment element; in response to receiving a selection of the selectable intelligent asset repayment element, selecting an intelligent asset repayment model from a plurality of asset repayment models; and utilizing the intelligent asset repayment model to transfer assets from the user account by: determining that the user account fails to satisfy an asset threshold corresponding to a deadline time; monitoring the user account for a post-deadline asset transfer; and in response to identifying the post-deadline asset transfer, initiating a digital transfer of assets from the user account according to an asset allocation hierarchy.

In one or more implementations, selecting the intelligent asset repayment model from the plurality of asset repayment models comprises selecting from an automatic asset repayment model corresponding to the deadline time, the intelligent asset repayment model, and a client-initiated asset repayment model. Moreover, in some embodiments, monitoring the user account for the post-deadline asset transfer comprises monitoring the user account for a post-deadline asset transfer corresponding to a pre-determined asset transfer class.

In addition, in some implementations, the series of acts 900 includes, in response to determining that the post-deadline asset transfer fails to satisfy an additional asset threshold: monitoring the user account for an additional post-deadline asset transfer; and in response to identifying the additional post-deadline asset transfer, initiating an additional digital transfer of assets from the user account according to the asset allocation hierarchy. Furthermore, in some implementations, the series of acts 900 includes providing, for display via the computing device, a digital notification indicating that failure of the user account to satisfy the asset threshold corresponding to the deadline time will initiate the digital transfer of assets upon receipt of the post-deadline asset transfer into the user account.

In some embodiments, the series of acts 900 includes providing, for display via the computing device with the digital notification, a selectable option to change to a different asset repayment model of the plurality of asset repayment models. Moreover, in some implementations, the series of acts 900 includes, upon identifying the post-deadline asset transfer, determining that the user account satisfies an additional asset threshold prior to initiating the digital transfer of assets from the user account.

In addition, in some embodiments, initiating the digital transfer of the assets from the user account according to the asset allocation hierarchy comprises: initiating a first transfer according to a first base limit value repayment priority; and initiating a second transfer according to a second early access repayment priority. Furthermore, in some embodiments, initiating the digital transfer of the assets from the user account according to the asset allocation hierarchy comprises initiating a third transfer according to a third lending repayment priority or initiating a fourth transfer according to a fourth revolving credit repayment priority.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
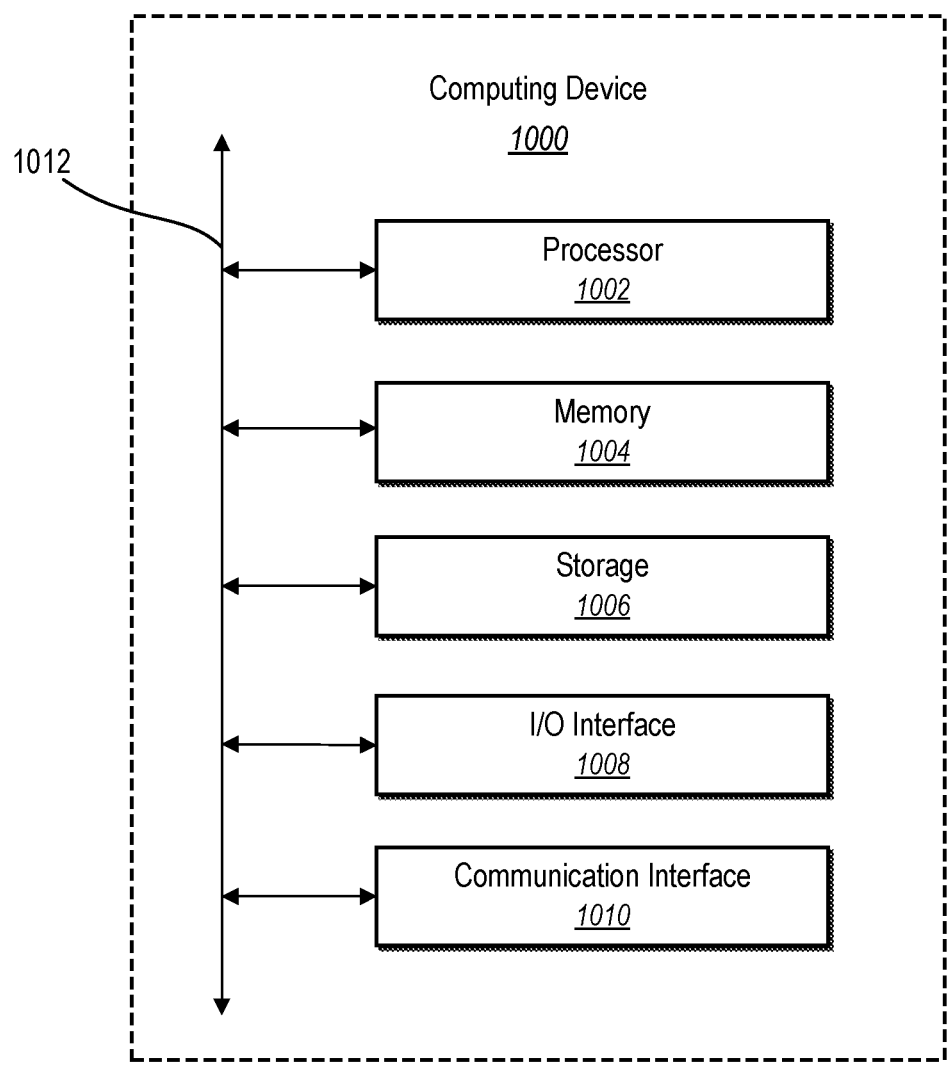
FIG. 10 illustrates a block diagram of a computing device for implementing one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., server(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

Figure 11:
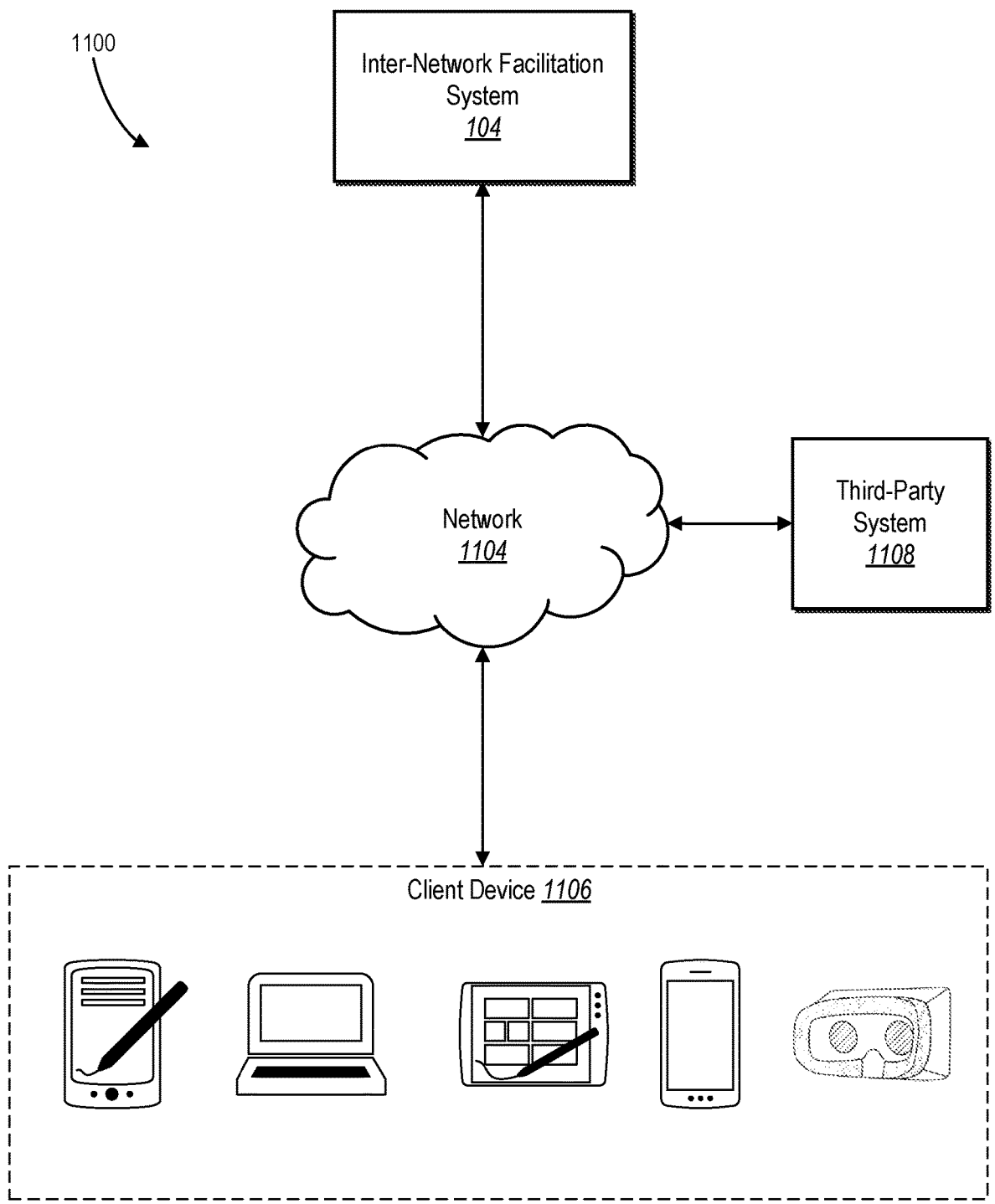
FIG. 11 illustrates an example environment for an inter-network facilitation system in accordance with one or more embodiments.

FIG. 11 illustrates an example network environment 1100 of the inter-network facilitation system 104. The network environment 1100 includes a client device 1106 (e.g., the client device 110), an inter-network facilitation system 104, and a third-party system 1108 connected to each other by a network 1104. Although FIG. 11 illustrates a particular arrangement of the client device 1106, the inter-network facilitation system 104, the third-party system 1108, and the network 1104, this disclosure contemplates any suitable arrangement of client device 1106, the inter-network facilitation system 104, the third-party system 1108, and the network 1104. As an example, and not by way of limitation, two or more of client device 1106, the inter-network facilitation system 104, and the third-party system 1108 communicate directly, bypassing network 1104. As another example, two or more of client device 1106, the inter-network facilitation system 104, and the third-party system 1108 may be physically or logically co-located with each other in whole or in part.

Moreover, although FIG. 11 illustrates a particular number of client devices 1106, inter-network facilitation systems 104, third-party systems 1108, and networks 1104, this disclosure contemplates any suitable number of client devices 1106, inter-network facilitation system 104, third-party systems 1108, and networks 1104. As an example, and not by way of limitation, network environment 1100 may include multiple client devices 1106, inter-network facilitation system 104, third-party systems 1108, and/or networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, the inter-network facilitation system 104 (which hosts the intelligent asset management system 106), and third-party system 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 12. A client device 1106 may enable a network user at the client device 1106 to access network 1104. A client device 1106 may enable its user to communicate with other users at other client devices 1106.

In particular embodiments, the client device 1106 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1106 one or more Hyper Text Markup Language ("HTML") files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1104) to link the third-party-system 1108. For example, the inter-network facilitation system 104 may receive authentication credentials from a user to link a third-party system 1108 such as an online bank account, credit account, debit account, or other financial account to a user account within the inter-network facilitation system 104. The inter-network facilitation system 104 can subsequently communicate with the third-party system 1108 to detect or identify balances, transactions, withdrawal, transfers, deposits, credits, debits, or other transaction types associated with the third-party system 1108. The inter-network facilitation system 104 can further provide the aforementioned or other financial information associated with the third-party system 1108 for display via the client device 1106. In some cases, the inter-network facilitation system 104 links more than one third-party system 1108, receiving account information for accounts associated with each respective third-party system 1108 and performing operations or transactions between the different systems via authorized network connections.

In particular embodiments, the inter-network facilitation system 104 may interface between an online banking system and a credit processing system via the network 1104. For example, the inter-network facilitation system 104 can provide access to a bank account of a third-party system 1108 and linked to a user account within the inter-network facilitation system 104. Indeed, the inter-network facilitation system 104 can facilitate access to, and transactions to and from, the bank account of the third-party system 1108 via a client application of the inter-network facilitation system 104 on the client device 1106. The inter-network facilitation system 104 can also communicate with a credit processing system, an ATM system, and/or other financial systems (e.g., via the network 1104) to authorize and process credit charges to a credit account, perform ATM transactions, perform transfers (or other transactions) across accounts of different third-party systems 1108, and to present corresponding information via the client device 1106.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1108), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1100 either directly or via network 1104. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1104.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1106. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1106 associated with users.

In addition, the third-party system 1108 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1104. A third-party system 1108 can communicate with the internetwork facilitation system 104 to provide financial information pertaining to balances, transactions, and other information, whereupon the inter-network facilitation system 104 can provide corresponding information for display via the client device 1106. In particular embodiments, a third-party system 1108 communicates with the inter-network facilitation system 104 to update account balances, transaction histories, credit usage, and other internal information of the inter-network facilitation system 104 and/or the third-party system 1108 based on user interaction with the inter-network facilitation system 104 (e.g., via the client device 1106). Indeed, the inter-network facilitation system 104 can synchronize information across one or more third-party systems 1108 to reflect accurate account information (e.g., balances, transactions, etc.) across one or more networked systems, including instances where a transaction (e.g., a transfer) from one third-party system 1108 affects another third-party system 1108.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, from at least one server device for display within a graphical user interface of a computing device corresponding to a user account, one or more selectable intelligent asset repayment elements for selecting among a plurality of asset repayment models;
in response to receiving, at the at least one server device, a user interaction via the one or more selectable intelligent asset repayment elements, selecting via the at least one server device, an intelligent asset repayment model from the plurality of asset repayment models comprising:
an automatic asset repayment model for automatically transferring assets at a predetermined time;
a client-initiated asset repayment model for transferring assets based on client device interactions with an account user interface; and
the intelligent asset repayment model for automatically transferring assets corresponding to qualifying post-deadline asset transfer classes after deadline times of the user account according to an asset allocation hierarchy, wherein the asset allocation hierarchy comprises an order of priority comprising: a base limit value repayment priority followed by an early access repayment priority followed by a lending repayment priority;
utilizing, via the at least one server device, the intelligent asset repayment model to automatically transfer qualifying post-deadline assets corresponding to the qualifying post-deadline asset transfer classes from the user account without additional user interaction corresponding to the user account according to the asset allocation hierarchy, by:
determining that the user account fails to satisfy an asset threshold corresponding to a deadline time;
based on determining that the user account fails to satisfy the asset threshold corresponding to the deadline time, initiating a postponement of user account monitoring utilizing the at least one server device;
identifying one or more monitoring account triggers for resuming monitoring of user account activity data of the user account;
upon detecting a monitoring account trigger of the one or more monitoring account triggers corresponding to the user account:
resuming monitoring, utilizing the at least one server device, the user account activity data of the user account to identify a plurality of asset transfers; and
generating, utilizing the at least one server device, classifications for the plurality of asset transfers, the classifications comprising an outbound asset transfer class, non-qualifying post-deadline asset transfer classes, and the qualifying post-deadline asset transfer classes;
filtering non-qualifying asset transfers corresponding to the outbound asset transfer class and the non-qualifying post-deadline asset transfer classes to identify a qualifying post-deadline asset transfer of the qualifying post-deadline assets corresponding to at least one of the qualifying post-deadline asset transfer classes for a post-deadline asset transfer; and
in response to identifying the qualifying post-deadline asset transfer and determining that the qualifying post-deadline assets cause the user account to satisfy the asset threshold, automatically initiating, via the at least one server device, a digital transfer of assets comprising the qualifying post-deadline assets, from the user account according to the asset allocation hierarchy and the order of priority comprising the base limit value repayment priority followed by the early access repayment priority followed by the lending repayment priority; and
providing, for display within at least one graphical user interface of the computing device corresponding to the user account, a digital notification of the digital transfer of assets comprising the qualifying post-deadline assets executed without additional user interaction corresponding to the user account.

2. The computer-implemented method of claim 1, further comprising determining an upcoming asset transfer to the user account by:
generating, utilizing a prediction machine learning model comprising a decision tree model or a neural network, a digital asset availability prediction for the user account; and
based on the digital asset availability prediction, transmitting, across computer networks and for display via the computing device, a pre-emptive digital notification indicating the upcoming asset transfer to the user account.

3. The computer-implemented method of claim 1, wherein identifying the qualifying post-deadline asset transfer of the qualifying post-deadline assets corresponding to the at least one of the qualifying post-deadline asset transfer classes comprises monitoring the user account activity data for an Automated Clearing House asset transfer class or an Original Credit Transaction asset transfer class.

4. The computer-implemented method of claim 1, further comprising, in response to determining that the qualifying post-deadline asset transfer fails to satisfy an additional asset threshold:
  monitoring, utilizing the at least one server device, the user account activity data of the user account and filtering the non-qualifying asset transfers corresponding to the outbound asset transfer class and the non-qualifying post-deadline asset transfer classes to identify an additional qualifying post-deadline asset transfer of additional qualifying post-deadline assets corresponding to one or more of the qualifying post-deadline asset transfer classes for an additional post-deadline asset transfer; and
  in response to identifying the additional qualifying post-deadline asset transfer and determining that the additional qualifying post-deadline assets cause the user account to satisfy the additional asset threshold, automatically initiating, via the at least one server device, an additional digital transfer of assets comprising the additional qualifying post-deadline assets, from the user account according to the asset allocation hierarchy and the order of priority.

5. The computer-implemented method of claim 1, further comprising:
  providing, for display via the computing device, a digital notification indicating that failure of the user account to satisfy the asset threshold corresponding to the deadline time will initiate the digital transfer of assets upon receipt of the qualifying post-deadline asset transfer into the user account; and
  providing, for display via the computing device with the digital notification, a selectable option to change from the intelligent asset repayment model to the automatic asset repayment model or to the client-initiated asset repayment model.

6. The computer-implemented method of claim 1, further comprising:
  determining an account liquidity threshold corresponding to an amount of assets to remain in the user account after the digital transfer of assets; and
  automatically initiating, via the at least one server device, the digital transfer of assets comprising a partial amount of the qualifying post-deadline assets from the user account based on the account liquidity threshold.

7. The computer-implemented method of claim 1, further comprising treating a particular non-qualifying asset transfer as a qualifying post-deadline asset transfer based on determining that the particular non-qualifying asset transfer satisfies a qualifying asset threshold.

8. The computer-implemented method of claim 1, wherein initiating the digital transfer of the assets from the user account according to the asset allocation hierarchy comprises:
  initiating a first transfer according to the base limit value repayment priority for repaying a penalty-free overdraft of the user account; and
  initiating a second transfer according to the early access repayment priority for replenishing an early withdrawal of assets from the user account prior to detecting that the user account received the assets.

9. The computer-implemented method of claim 8, wherein initiating the digital transfer of the assets from the user account according to the asset allocation hierarchy comprises:
  initiating a third transfer according to a revolving credit repayment priority; and
  initiating a fourth transfer according to a revolving credit repayment priority.

10. A non-transitory computer-readable medium storing instructions that, when executed by at least one processor, cause a computing device to:
  provide, from at least one server device for display within a graphical user interface of a computing device corresponding to a user account, one or more selectable intelligent asset repayment elements for selecting among a plurality of asset repayment models;
  in response to receiving, at the at least one server device, a user interaction via the one or more selectable intelligent asset repayment elements, select via the at least one server device, an intelligent asset repayment model from the plurality of asset repayment models comprising:
    an automatic asset repayment model for automatically transferring assets at a predetermined time;
    a client-initiated asset repayment model for transferring assets based on client device interactions with an account user interface; and
    the intelligent asset repayment model for automatically transferring assets corresponding to qualifying post-deadline asset transfer classes after deadline times of the user account according to an asset allocation hierarchy, wherein the asset allocation hierarchy comprises an order of priority comprising: a base limit value repayment priority followed by an early access repayment priority followed by a lending repayment priority;
  utilize, via the at least one server device, the intelligent asset repayment model to automatically transfer qualifying post-deadline assets corresponding to the qualifying post-deadline asset transfer classes from the user account without additional user interaction corresponding to the user account according to the asset allocation hierarchy, by:
    determining that the user account fails to satisfy an asset threshold corresponding to a deadline time;
    based on determining that the user account fails to satisfy the asset threshold corresponding to the deadline time, initiating a postponement of user account monitoring utilizing the at least one server device;
    identifying one or more monitoring account triggers for resuming monitoring of user account activity data of the user account;
    upon detecting a monitoring account trigger of the one or more monitoring account triggers corresponding to the user account:
      resuming monitoring, utilizing the at least one server device, the user account activity data of the user account to identify a plurality of asset transfers; and
      generating, utilizing the at least one server device, classifications for the plurality of asset transfers, the classifications comprising an outbound asset transfer class, non-qualifying post-deadline asset transfer classes, and the qualifying post-deadline asset transfer classes;

filtering non-qualifying asset transfers corresponding to the outbound asset transfer class and the non-qualifying post-deadline asset transfer classes to identify a qualifying post-deadline asset transfer of the qualifying post-deadline assets corresponding to at least one of the qualifying post-deadline asset transfer classes for a post-deadline asset transfer; and in response to identifying the qualifying post-deadline asset transfer and determining that the qualifying post-deadline assets cause the user account to satisfy the asset threshold, automatically initiating, via the at least one server device, a digital transfer of assets comprising the qualifying post-deadline assets, from the user account according to the asset allocation hierarchy and the order of priority comprising the base limit value repayment priority followed by the early access repayment priority followed by the lending repayment priority; and provide, for display within at least one graphical user interface of the computing device corresponding to the user account, a digital notification of the digital transfer of assets comprising the qualifying post-deadline assets executed without additional user interaction corresponding to the user account.

11. The non-transitory computer-readable medium of claim 10, further comprising instructions that, when executed by the at least one processor, cause the computing device to determine an upcoming asset transfer to the user account by:

generating, utilizing an intent prediction machine learning model, a digital intent classification for the user account; and based on the digital intent classification, transmitting, across computer networks and for display via the computing device, a pre-emptive digital notification indicating the upcoming asset transfer to the user account.

12. The non-transitory computer-readable medium of claim 10, further comprising instructions that, when executed by the at least one processor, cause the computing device to, in response to determining that the qualifying post-deadline asset transfer fails to satisfy an additional asset threshold:

monitor, utilizing the at least one server device, the user account activity data of the user account and filter the non-qualifying asset transfers corresponding to the outbound asset transfer class and the non-qualifying post-deadline asset transfer classes to identify an additional qualifying post-deadline asset transfer of additional qualifying post-deadline assets corresponding to one or more of the qualifying post-deadline asset transfer classes for an additional post-deadline asset transfer; and in response to identifying the additional qualifying post-deadline asset transfer and determining that the qualifying post-deadline assets cause the user account to satisfy the additional asset threshold, automatically initiate, via the at least one server device, an additional digital transfer of assets comprising the additional qualifying post-deadline assets, from the user account according to the asset allocation hierarchy and the order of priority.

13. The non-transitory computer-readable medium of claim 10, further comprising instructions that, when executed by the at least one processor, cause the computing device to provide, for display via the computing device:

a digital notification indicating that failure of the user account to satisfy the asset threshold corresponding to the deadline time will initiate the digital transfer of assets upon receipt of the qualifying post-deadline asset transfer into the user account; and a selectable option, within the digital notification, to change from the intelligent asset repayment model to the automatic asset repayment model or to the client-initiated asset repayment model.

14. The non-transitory computer-readable medium of claim 10, further comprising instructions that, when executed by the at least one processor, cause the computing device to treat a particular non-qualifying asset transfer as a qualifying post-deadline asset transfer based on determining that the particular non-qualifying asset transfer satisfies a qualifying asset threshold.

15. The non-transitory computer-readable medium of claim 10, further comprising instructions that, when executed by the at least one processor, cause the computing device to initiate the digital transfer of the assets from the user account according to the asset allocation hierarchy by:

initiating a first transfer according to the base limit value repayment priority for repaying a penalty-free overdraft of the user account; and initiating a second transfer according to the early access repayment priority for replenishing an early withdrawal of assets from the user account prior to detecting that the user account received the assets.

16. A system comprising:

at least one processor; and at least one non-transitory computer-readable storage medium storing instructions that, when executed by the at least one processor, cause the system to:

provide, from at least one server device for display within a graphical user interface of a computing device corresponding to a user account, one or more selectable intelligent asset repayment elements for selecting among a plurality of asset repayment models;

in response to receiving, at the at least one server device, a user interaction via the one or more selectable intelligent asset repayment elements, select via the at least one server device, an intelligent asset repayment model from the plurality of asset repayment models comprising:

an automatic asset repayment model for automatically transferring assets at a predetermined time;

a client-initiated asset repayment model for transferring assets based on client device interactions with an account user interface; and the intelligent asset repayment model for automatically transferring assets corresponding to qualifying post-deadline asset transfer classes after deadline times of the user account according to an asset allocation hierarchy, wherein the asset allocation hierarchy comprises an order of priority comprising: a base limit value repayment priority followed by an early access repayment priority followed by a lending repayment priority;

utilize, via the at least one server device, the intelligent asset repayment model to automatically transfer qualifying post-deadline assets corresponding to the qualifying post-deadline asset transfer classes from the user account without additional user interaction corresponding to the user account according to the asset allocation hierarchy, by:
  determining that the user account fails to satisfy an asset threshold corresponding to a deadline time;
  based on determining that the user account fails to satisfy the asset threshold corresponding to the deadline time, initiating a postponement of user account monitoring utilizing the at least one server device;
  identifying one or more monitoring account triggers for resuming monitoring of user account activity data of the user account;
  upon detecting a monitoring account trigger of the one or more monitoring account triggers corresponding to the user account:
    resuming monitoring, utilizing the at least one server device, the user account activity data of the user account to identify a plurality of asset transfers; and
    generating, utilizing the at least one server device, classifications for the plurality of asset transfers, the classifications comprising an outbound asset transfer class, non-qualifying post-deadline asset transfer classes, and the qualifying post-deadline asset transfer classes;
  filtering non-qualifying asset transfers corresponding to the outbound asset transfer class and the non-qualifying post-deadline asset transfer classes to identify a qualifying post-deadline asset transfer of the qualifying post-deadline assets corresponding to at least one of the qualifying post-deadline asset transfer classes for a post-deadline asset transfer; and
  in response to identifying the qualifying post-deadline asset transfer and determining that the qualifying post-deadline assets cause the user account to satisfy the asset threshold, automatically initiating, via the at least one server device, a digital transfer of assets comprising the qualifying post-deadline assets, from the user account according to an asset allocation hierarchy and the order of priority comprising the base limit value repayment priority followed by the early access repayment priority followed by the lending repayment priority; and
  provide, for display within at least one graphical user interface of the computing device corresponding to the user account, a digital notification of the digital transfer of assets comprising the qualifying post-deadline assets executed without additional user interaction corresponding to the user account.

17. The system of claim 16, further comprising instructions that, when executed by the at least one processor, cause the system to determine an upcoming asset transfer to the user account by:
  generating, utilizing a prediction machine learning model comprising a decision tree model or a neural network, a digital asset availability prediction for the user account; and
  based on the digital asset availability prediction, transmitting, across computer networks and for display via the computing device, a pre-emptive digital notification indicating the upcoming asset transfer to the user account.

18. The system of claim 16, further comprising instructions that, when executed by the at least one processor, cause the system to, in response to determining that the qualifying post-deadline asset transfer fails to satisfy an additional asset threshold:
  monitor, utilizing the at least one server device, the user account activity data of the user account and filter the non-qualifying asset transfers corresponding to the outbound asset transfer class and the non-qualifying post-deadline asset transfer classes to identify an additional qualifying post-deadline asset transfer of additional qualifying post-deadline assets corresponding to one or more of the qualifying post-deadline asset transfer classes for an additional post-deadline asset transfer; and
  in response to identifying the additional qualifying post-deadline asset transfer and determining that the qualifying post-deadline assets cause the user account to satisfy the additional asset threshold, automatically initiate, via the at least one server device, an additional digital transfer of assets comprising the additional qualifying post-deadline assets, from the user account according to the asset allocation hierarchy and the order of priority.

19. The system of claim 16, further comprising instructions that, when executed by the at least one processor, cause the system to provide, for display via the computing device:
  a digital notification indicating that failure of the user account to satisfy the asset threshold corresponding to the deadline time will initiate the digital transfer of assets upon receipt of the qualifying post-deadline asset transfer into the user account; and
  a selectable option, within the digital notification, to change from the intelligent asset repayment model to the automatic asset repayment model or to the client-initiated asset repayment model.

20. The system of claim 16, further comprising instructions that, when executed by the at least one processor, cause the system to initiate the digital transfer of the assets from the user account according to the asset allocation hierarchy by:
  initiating a first transfer according to the base limit value repayment priority for repaying a penalty-free overdraft of the user account; and
  initiating a second transfer according to the early access repayment priority for replenishing an early withdrawal of assets from the user account prior to detecting that the user account received the assets.

* * * * *